US012587580B2

(12) United States Patent
Pollakowski et al.

(10) Patent No.: US 12,587,580 B2
(45) Date of Patent: Mar. 24, 2026

(54) METHOD TO MANAGE FILE DOWNLOADS

(71) Applicant: NOKIA TECHNOLOGIES OY, Espoo (FI)

(72) Inventors: Olaf Pollakowski, Berlin (DE); Linda Horn, Randolph, NJ (US)

(73) Assignee: NOKIA TECHNOLOGIES OY, Espoo (FI)

( * ) Notice: Subject to any disclaimer, the term of this patent is extended or adjusted under 35 U.S.C. 154(b) by 16 days.

(21) Appl. No.: 17/956,370

(22) Filed: Sep. 29, 2022

(65) Prior Publication Data

US 2023/0120344 A1 Apr. 20, 2023

Related U.S. Application Data

(60) Provisional application No. 63/250,060, filed on Sep. 29, 2021.

(51) Int. Cl.
*G06F 3/01* (2006.01)
*H04L 67/06* (2022.01)
*H04W 24/10* (2009.01)

(52) U.S. Cl.
CPC .................................. *H04L 67/06* (2013.01)

(58) Field of Classification Search
CPC ..... H04L 67/02; H04L 67/06; H04L 67/1097; H04L 67/10; G06F 11/3409; G06F 16/182; G06F 11/3055; G06F 11/324
See application file for complete search history.

(56) References Cited

U.S. PATENT DOCUMENTS

| | | | | |
|---|---|---|---|---|
| 2006/0059267 A1* | 3/2006 | Cugi | ....................... | H04L 67/06 709/230 |
| 2008/0091773 A1* | 4/2008 | Hameen-Anttila | ... | H04L 67/125 709/230 |
| 2012/0072871 A1* | 3/2012 | Seo | ....................... | H04N 21/472 715/838 |
| 2013/0263012 A1* | 10/2013 | Stallings | ................. | G06F 16/44 715/748 |
| 2020/0092789 A1* | 3/2020 | Lee | ....................... | H04W 40/38 |

(Continued)

FOREIGN PATENT DOCUMENTS

WO 2020243533 A1 12/2020

OTHER PUBLICATIONS

"Nokia", 3GPP TSG-SA5 Meeting #137-e, Change Request, May 10, 2021, https://www.3gpp.org/ftp/tsg_sa/WG5_TM/TSGS5_137e/Inbox/Drafts/S5-213673d1%20Rel-17%20DraftCR%2028.537%20for%20MADCOL%20and%20FIMA%20.docx (Year: 2021).*

(Continued)

*Primary Examiner* — Nicholas R Taylor
*Assistant Examiner* — Ho T Shiu
(74) *Attorney, Agent, or Firm* — SQUIRE PATTON BOGGS (US) LLP

(57) ABSTRACT

Systems, methods, apparatuses, and computer program products for downloading files from a MnS consumer to a MnS producer. One method may include a MnS producer receiving a request to create a file download job object associated with a file download job from a management service consumer and initiating the file download job. The MnS producer may further transmit download progress status information associated with the file download job to the management service consumer.

6 Claims, 21 Drawing Sheets

(56) References Cited

U.S. PATENT DOCUMENTS

2021/0219162 A1\*  7/2021  Yao ......................... H04L 41/04
2024/0049060 A1\*  2/2024  Narasimham ......... H04W 28/24

OTHER PUBLICATIONS

3GPP TS 28.532 V16.9.0 (Sep. 2021), 3rd Generation Partnership Project; Technical Specification Group Services and System Aspects; Management and orchestration; Generic management services; (Release 16), 227 pages.
3GPP TS 28.622 V16.9.0 (Sep. 2021), 3rd Generation Partnership Project; Technical Specification Group Services and System Aspects; Telecommunication management; Generic Network Resource Model (NRM) Integration Reference Point (IRP); Information Service (IS) (Release 16), 67 pages.

Extended European Search Report dated Jan. 20, 2023, corresponding to European Patent Application No. 22198229.1.
"5G; Management and orchestration; Generic management services (3GPP TS 28.532 version 16.7.0 Release 16)", ETSI Technical Specification, European Telecommunications Standards Institute (ETSI), 650, Route Des Lucioles ; F-06921 Sophia-Antipolis ; France vol. 3GPP SA, No. V16.7.0.
European Communication pursuant to Article 94(3) EPC, corresponding to EP Application No. 22 198 229.1, dated Apr. 10, 2025.
Nokia et al., "Rel-17 Input to DraftCR 28.537 Add requirements for file upload", 3GPP Draft; S5-213548, 3rd Generation Partnership Project (3GPP), Mobile Competence Centre; 650, Route Des Lucioles; F-06921 Sophia-Antipolis Cedex; France; 3 pages.
"5G; Management and orchestration; Management capabilities (3GPP TS 28.537 version 16.0.0 Release 16)", ETSI Technical Specification, European Telecommunications Standards Institute (ETSI), 650, Route Des Lucioles; F-06921 Sophia-Antipolis; France; 15 pages.

\* cited by examiner

FIG. 1B

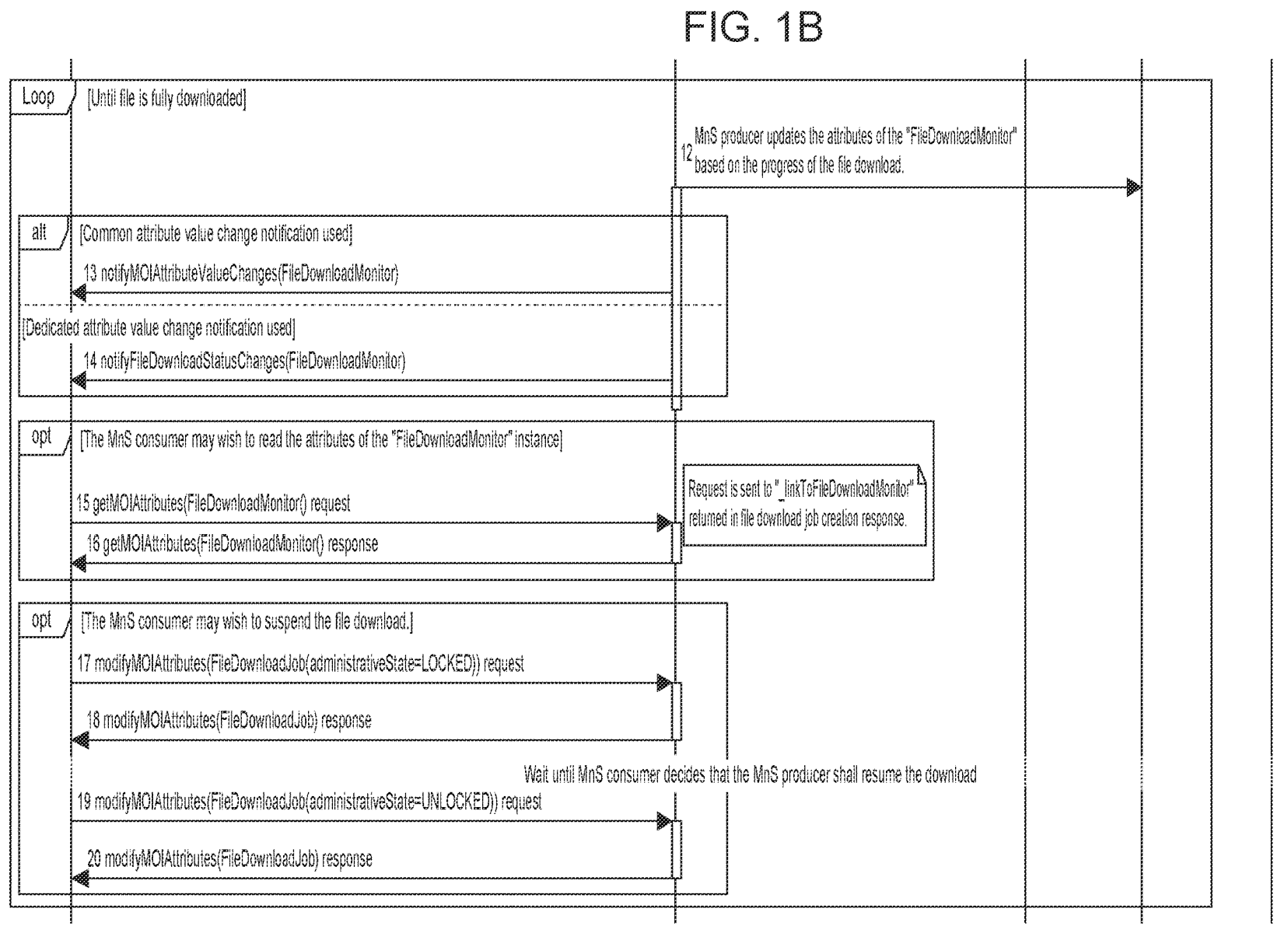

Loop    [Until file is fully downloaded]

MnS producer updates the attributes of the "FileDownloadMonitor"
12 based on the progress of the file download.

alt    [Common attribute value change notification used]

13 notifyMOIAttributeValueChanges(FileDownloadMonitor)

[Dedicated attribute value change notification used]

14 notifyFileDownloadStatusChanges(FileDownloadMonitor)

opt    [The MnS consumer may wish to read the attributes of the "FileDownloadMonitor" instance]

15 getMOIAttributes(FileDownloadMonitor) request

Request is sent to "_linkToFileDownloadMonitor"
returned in file download job creation response.

16 getMOIAttributes(FileDownloadMonitor) response opt    [The MnS consumer may wish to suspend the file download.]

17 modifyMOIAttributes(FileDownloadJob(administrativeState=LOCKED)) request 18 modifyMOIAttributes(FileDownloadJob) response Wait until MnS consumer decides that the MnS producer shall resume the download 19 modifyMOIAttributes(FileDownloadJob(administrativeState=UNLOCKED)) request 20 modifyMOIAttributes(FileDownloadJob) response

METHOD TO MANAGE FILE DOWNLOADS

CROSS REFERENCE TO RELATED APPLICATION

This application claims the benefit of U.S. Provisional Patent Application No. 63/250,060, filed on Sep. 29, 2021. The entire content of the above-referenced application is hereby incorporated by reference.

TECHNICAL FIELD

Some example embodiments may generally relate to mobile or wireless telecommunication systems, such as Long Term Evolution (LTE), fifth generation (5G) radio access technology (RAT), new radio (NR) access technology, and/or other communications systems. For example, certain example embodiments may relate to systems and/or methods for downloading files from a management service (MnS) consumer to a MnS producer.

BACKGROUND

Examples of mobile or wireless telecommunication systems may include radio frequency (RF) 5G RAT, the Universal Mobile Telecommunications System (UMTS) Terrestrial Radio Access Network (UTRAN), LTE Evolved UTRAN (E-UTRAN), LTE-Advanced (LTE-A), LTE-A Pro, NR access technology, and/or MulteFire Alliance. 5G wireless systems refer to the next generation (NG) of radio systems and network architecture. A 5G system is typically built on a 5G NR, but a 5G (or NG) network may also be built on E-UTRA radio. It is expected that NR can support service categories such as enhanced mobile broadband (eMBB), ultra-reliable low-latency-communication (URLLC), and massive machine-type communication (mMTC). NR is expected to deliver extreme broadband, ultra-robust, low-latency connectivity, and massive networking to support the Internet of Things (IoT). The next generation radio access network (NG-RAN) represents the RAN for 5G, which may provide radio access for NR, LTE, and LTE-A. It is noted that the nodes in 5G providing radio access functionality to a user equipment (e.g., similar to the Node B in UTRAN or the Evolved Node B (eNB) in LTE) may be referred to as next-generation Node B (gNB) when built on NR radio, and may be referred to as next-generation eNB (NG-eNB) when built on E-UTRA radio.

SUMMARY

In accordance with some example embodiments, a method may include transmitting, by a management service consumer, a request to create a file download job object associated with a file download job to a management service producer. The method may further include receiving, by the management service consumer, download progress status information associated with the file download job from the management service producer.

In accordance with certain example embodiments, an apparatus may include means for transmitting a request to create a file download job object associated with a file download job to a management service producer. The apparatus may further include means for receiving download progress status information associated with the file download job from the management service producer.

In accordance with various example embodiments, a non-transitory computer readable medium may be encoded with instructions that may, when executed in hardware, perform a method. The method may include transmitting a request to create a file download job object associated with a file download job to a management service producer. The method may further include receiving download progress status information associated with the file download job from the management service producer.

In accordance with some example embodiments, a computer program product may perform a method. The method may include transmitting a request to create a file download job object associated with a file download job to a management service producer. The method may further include receiving download progress status information associated with the file download job from the management service producer.

In accordance with certain example embodiments, an apparatus may include at least one processor and at least one memory including computer program code. The at least one memory and the computer program code may be configured to, with the at least one processor, cause the apparatus to at least transmit a request to create a file download job object associated with a file download job to a management service producer. The at least one memory and the computer program code may be further configured to, with the at least one processor, cause the apparatus to at least receive download progress status information associated with the file download job from the management service producer.

In accordance with various example embodiments, an apparatus may include circuitry configured to transmit a request to create a file download job object associated with a file download job to a management service producer. The circuitry may further be configured to receive download progress status information associated with the file download job from the management service producer.

In accordance with some example embodiments, a method may include receiving, by a management service producer, a request to create a file download job object associated with a download job from a management service consumer. The method may further include initiating, by the management service producer, the file download job. The method may further include transmitting, by the management service producer, download progress status information associated with the file download job to the management service consumer.

In accordance with certain example embodiments, an apparatus may include means for receiving a request to create a file download job object associated with a download job from a management service consumer. The apparatus may further include means for initiating the file download job. The apparatus may further include means for transmitting download progress status information associated with the file download job to the management service consumer.

In accordance with various example embodiments, a non-transitory computer readable medium may be encoded with instructions that may, when executed in hardware, perform a method. The method may include receiving a request to create a file download job object associated with a download job from a management service consumer. The method may further include initiating the file download job. The method may further include transmitting download progress status information associated with the file download job to the management service consumer.

In accordance with some example embodiments, a computer program product may perform a method. The method may include receiving a request to create a file download job object associated with a download job from a management service consumer. The method may further include initiating the file download job. The method may further include transmitting download progress status information associated with the file download job to the management service consumer.

In accordance with certain example embodiments, an apparatus may include at least one processor and at least one memory including computer program code. The at least one memory and the computer program code may be configured to, with the at least one processor, cause the apparatus to at least receive a request to create a file download job object associated with a download job from a management service consumer. The at least one memory and the computer program code may be further configured to, with the at least one processor, cause the apparatus to at least initiate the file download job. The at least one memory and the computer program code may be further configured to, with the at least one processor, cause the apparatus to at least transmit download progress status information associated with the file download job to the management service consumer.

In accordance with various example embodiments, an apparatus may include circuitry configured to request to create a file download job object associated with a download job from a management service consumer. The circuitry may further be configured to initiate the file download job. The circuitry may further be configured to transmit download progress status information associated with the file download job to the management service consumer.

BRIEF DESCRIPTION OF THE DRAWINGS

For proper understanding of example embodiments, reference should be made to the accompanying drawings, wherein:

FIGS. 1A-1D illustrate an example of a signaling diagram according to certain example embodiments.

FIGS. 2A-2D illustrate an example of a signaling diagram according to some example embodiments.

FIGS. 3A-3D illustrate an example of a signaling diagram according to various example embodiments.

FIGS. 4A-4C illustrate an example of a signaling diagram according to certain example embodiments.

FIG. 5 illustrates an example of an NtfSubscriptionControl object.

Figure 6:
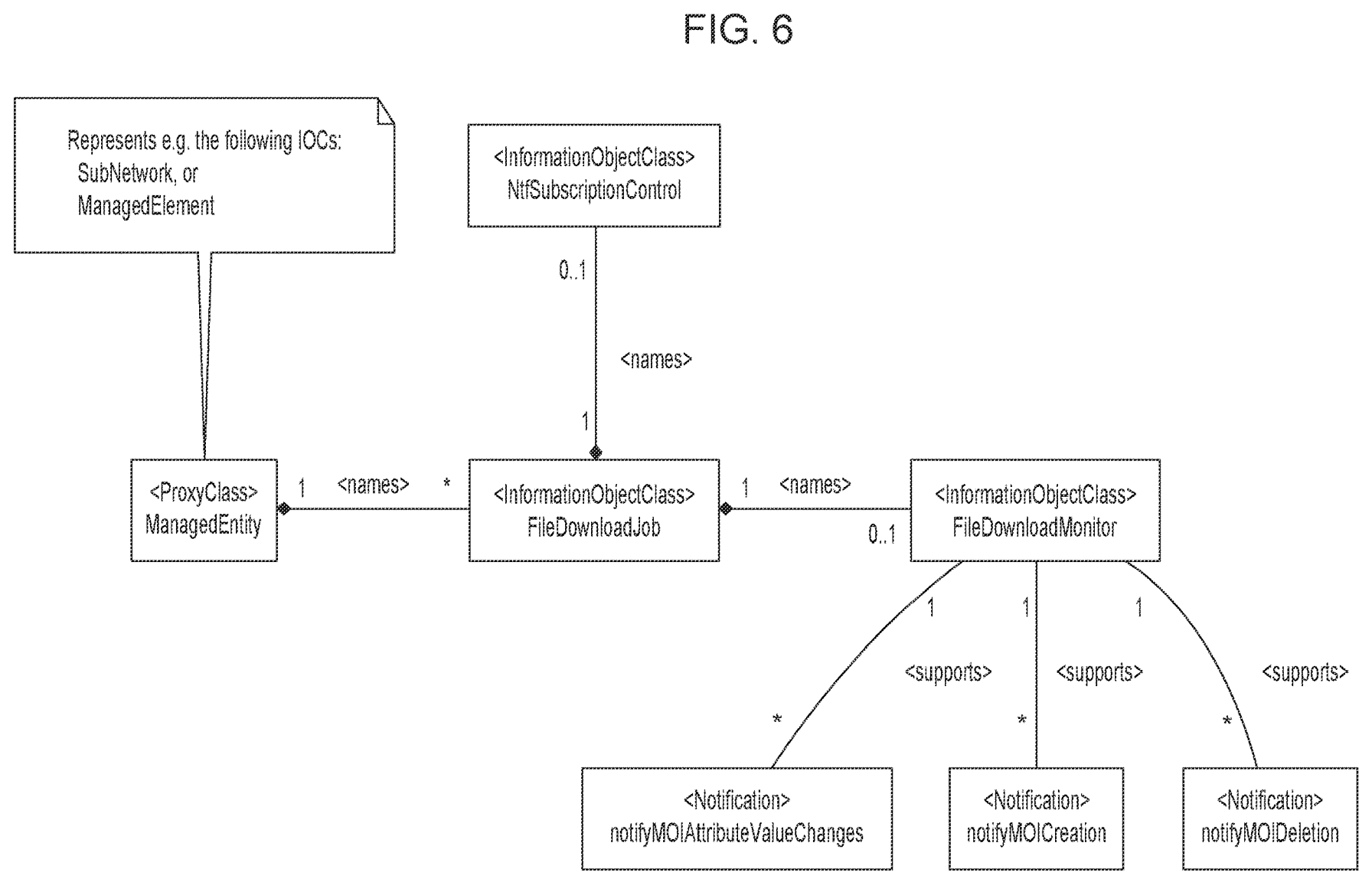

FIG. 6 illustrates another example of an NtfSubscriptionControl object.

FIG. 7 illustrates another example of an NtfSubscriptionControl object.

FIG. 10 illustrates an example of a 5G network and system architecture according to certain example embodiments.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for downloading files from a MnS consumer to a MnS producer is not intended to limit the scope of certain example embodiments, but is instead representative of selected example embodiments.

Third Generation Partnership Project (3GPP) transfers a variety of types of files between MnS producers and MnS consumers. For example, measurement data files, KPI data files, trace data files, and MDT data files may be transferred from MnS producers to MnS consumers. Similarly, certificate files, beamforming configuration files, ML model files, and software files may be transferred from MnS consumers to MnS producers. However, 3GPP MnS consumers currently cannot request a MnS producer (such as a BTS) to download a file from a MnS consumer or some file server. Certain example embodiments described herein may have various benefits and/or advantages to overcome the disadvantages described above. For example, certain example embodiments may enable a MnS consumer to request a MnS producer to download files from a MnS consumer, such as a file server, and to monitor the file download progress. Thus, certain example embodiments discussed below are directed to improvements in computer-related technology.

Some example embodiments discussed below may be aligned with a fully model driven approach, and may use the normal generic Create, Read, Update, Delete (CRUD) operations. For notifications, normal generic CM notifications may be used to fully align with the model driven approach. However, dedicated new notifications may be provided as well. To request a MnS producer to download a file, the MnS consumer may create a file download job object on the MnS producer containing all of the information that the MnS producer needs to download the file. The MnS producer may allow the MnS consumer to monitor the file download progress. The download progress status information may be contained in a dedicated file download status monitor object or may be included in the file download job object. Furthermore, various example embodiments may enable cancelling an ongoing file download, which may be useful for long running file downloads.

In addition, certain example embodiments may be with or without implicit subscriptions for download status update notifications; with notifications for reporting the file download status; without notifications and polling for retrieving the file download status; with or without dedicated file download monitoring; using common CM notifications as notifications for reporting the file download status; and/or using dedicated notifications for reporting the file download status.

Figure 9:
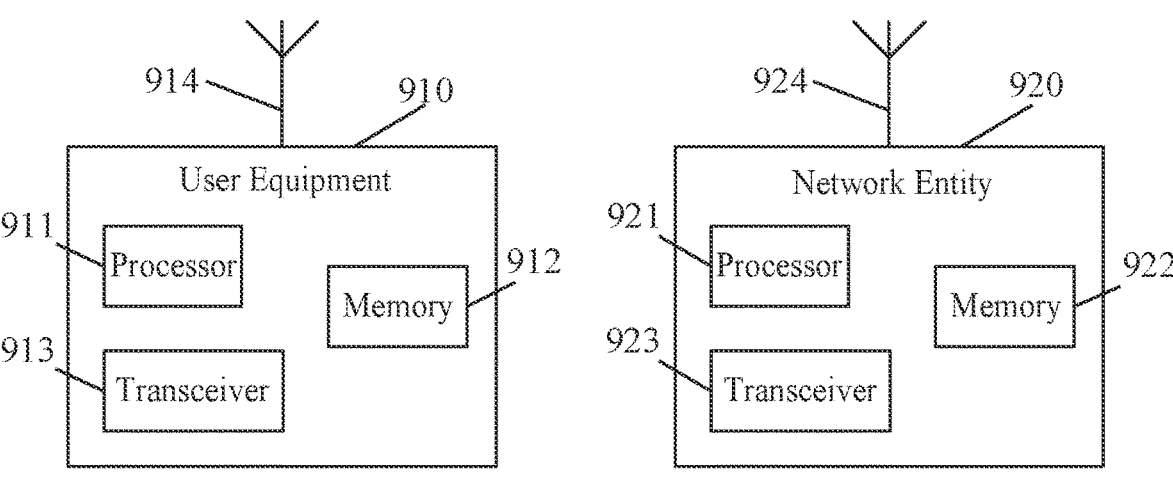
FIG. 9 illustrates an example of various network devices according to some example embodiments.

FIGS. 1A-1D illustrate an example of a signaling diagram for downloading files from a MnS consumer to a MnS producer, according to an embodiment. MnS 140 and MnS producer 150 may be similar to UE 910 and NE 920, as illustrated in FIG. 9 discussed below, according to certain example embodiments.

Figure 1A:
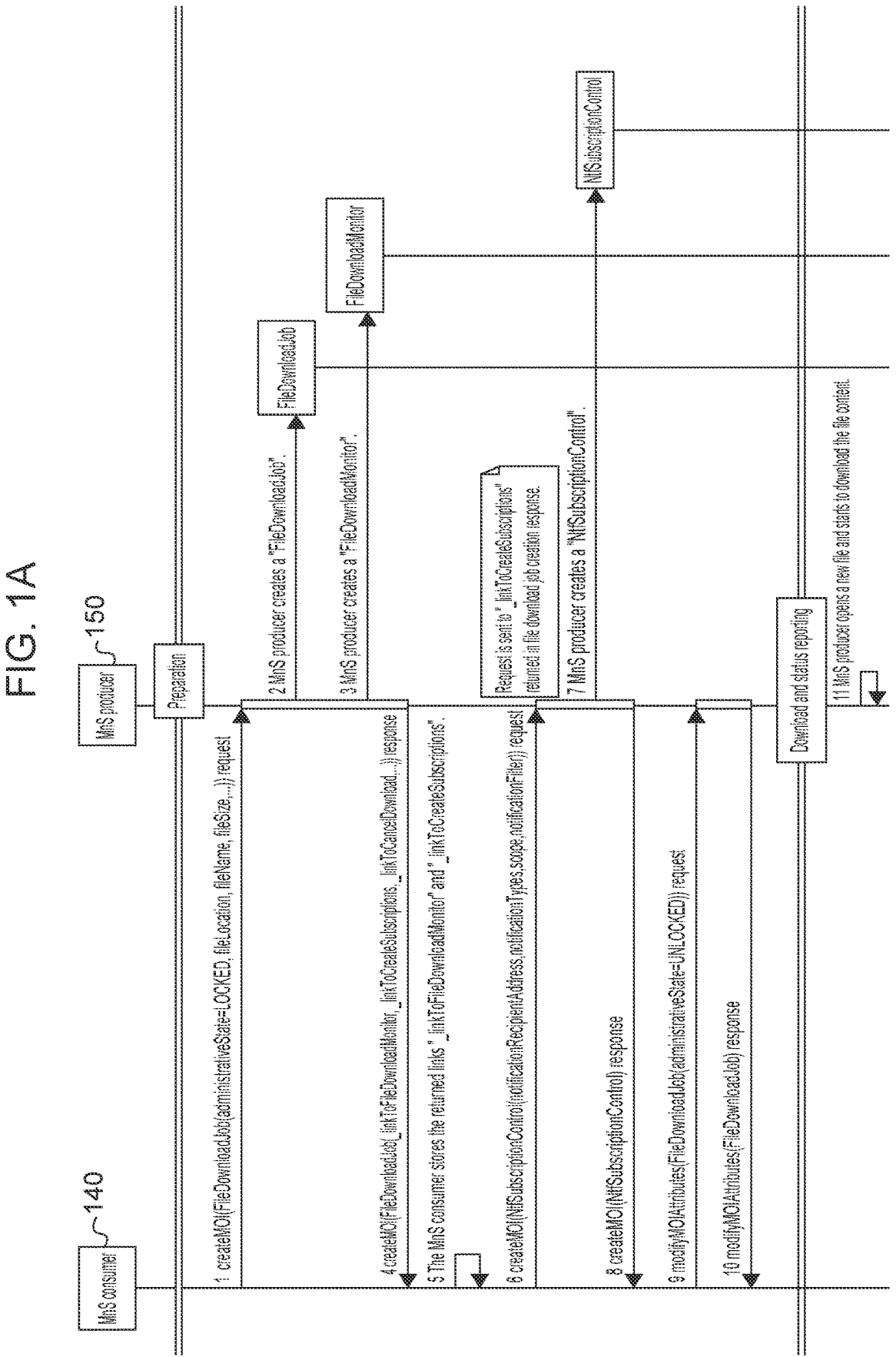

In FIG. 1A at 1, MnS consumer 140 may transmit a request, such as createMOI(FileDownloadJob (administrativeState=LOCKED, filelocation, filename, fileSize . . . )) request, to create a file download job object associated with a file download job to MnS producer 130. For requesting MnS producer 150 to create the object, a normal Create operation may be used.

In FIG. 1A at 2, MnS producer 150 may create a FileDownloadJob object. In some example embodiments, the FileDownloadJob object may be name-contained under many object types. The exact location may depend on the context within which a file download is requested. For example, for software downloaded onto a base transceiver station (BTS), the FileDownloadJob may be name-contained under ManagedElement, or for software download, onto an Element Manager under SubNetwork or ManagementNode. For downloading a beamforming configuration file, the FileDownloadJob may be name-contained under a resource representing the base station (BTS) or radio unit (RU). For downloading a certificate file, the FileDownloadJob may be name-contained under a resource representing the Trust Store for the appropriate managed object. For downloading a ML model file, the FileDownloadJob may be name-contained under a resource representing the ML application that uses this ML model.

In some certain example embodiments, the FileDownloadJob may contain all attributes required by the MnS producer to download the file, including file name and location (address), provided for FTP and HTTP in the format of a URI (which may be defined in RFC3986); protocols supported for retrieving the files (FTP/SFTP/FTPES or HTTP GET/HTTPS GET); file size; and/or compression type.

In various example embodiments, the FileDownloadJob may include state attributes such as administrativeState, allowed values: LOCKED, UNLOCKED; and operationalState, allowed values: DISABLED, ENABLED, which may be defined in ITU-T X.731. The FileDownloadJob may further include links such as _linkToCreateSubscriptions, _linkToCreatedSubscription, _linkToFileDownloadMonitor, and _linkToCancelDownload. Furthermore, the FileDownloadJob may support alarm notifications, such as those defined in 3GPP TS 28.532, which may enable reporting alarms related to the file download process.

The FileDownloadJob object may comprise any of the following parameters:

FileDownloadJob. The FileDownloadMonitor object may also be name-contained by any other object, if it has a relationship (pointer) to the related FileDownloadJob. The status and progress attributes of the FileDownloadMonitor may expose information such as the file is open and contains x % of its target content; estimated time remaining until the file is fully downloaded and closed; the file is closed and contains 100% of its target content; and/or the duration the download process is already running.

In some various example embodiments, when MnS consumer 140 does not provide a notificationRecipientAddress for implicit notification subscription or does not subscribe to notifications using the normal mechanism, MnS producer 150 may not send notifications with file download status information. Some deployments may not support notifications at all. The MnS consumer 150 may read, using a normal Read operation, the attributes of the FileDownloadMonitor with the frequency suggested by suggestedPollingInterval. In case the status attributes are integrated into the FileDownloadJob, MnS consumer 140 may need to read the status attributes there.

In some example embodiments, FileDownloadMonitor may include status attributes such as status, allowed values: NOT_STARTED, ONGOING, SUCCESS, FAILURE; errorReason: allowed values: string or standardized error reasons/codes, present only when status=FAILURE; progress, allowed values: integer between 0 and 100 with increments of e.g., 5, unit is percent; durationSinceStart, allowed avalues are e.g., according to ISO 8601 duration; and/or

| Attribute name | Present in creation request | Present in creation response | Definition |
|---|---|---|---|
| operationalState | No | Yes | Operational state |
| administrative State | Yes | Yes | Administrative state |
| fileName | Yes | Yes | Name of the file to be downloaded |
| fileLocation | Yes | Yes | Location of the file to be downloaded |
| downloadProtocol | Yes | Yes | Protocol to be used for the download |
| fileSize | Yes | Yes | Size of the file |
| fileCompressionType | Yes | Yes | Compression type of the file |
| stepWidth | Yes | Yes | Step width for the values of the "progress" attribute |
| notificationRecipientAddress | Yes | Yes | Notification recipient address, present in the creation request when the MnS producer requests an implicit notification subscription |
| suggestedPollingInterval | No | Yes | Suggested period for polling the status attributes |
| cancelFileDownload | No | No | Attribute, when set to "TRUE", indicates to the MnS producer to cancel a file download. Only used when the job and monitor resources are persisted for log purposes. |
| _linkToCreateSubscriptions | No | Yes | Link where notification subscriptions can be created, present in the creation response only when no implicit notification subscription is requested |
| _linkToCreatedSubscription | No | Yes | Link to the subscription created by the MnS producer when implicit notification subscription is requested. The MnS consumer may use this link to modify the subscription. Note the subscription is deleted automatically by the MnS producer for implicit subscriptions. |
| _linkToFileDownloadMonitor | No | Yes | Link to the "FileDownLoadMonitor", present in the creation response only when a "FileDownloadMonitor" is used by the MnS producer |
| _linkToCancelDownload | No | Yes | Link to cancel the download process |

In FIG. 1A at 3, MnS producer 150 may create a FileDownloadMonitor object. In various example embodiments, the FileDownloadMonitor object may hold the status of the file download job, allowing MnS consumer to monitor the file download progress. It is created by MnS producer 150. Its attributes are populated and updated by the MnS producer as the file download progresses. In addition, the FileDownloadMonitor object may be name-contained by a durationUntilEnd, allowed avalues are e.g., according to ISO 8601 duration. The attributes progress, durationSinceStart and durationUntilEnd may be modified in discrete steps only where the step width is chosen by MnS producer 140 in a way as to not overload MnS consumer 150 with too much and frequent information on the progress. With stepWidth, the step width of the progress attribute may be selected also by MnS consumer 140 in the FileDownload- Request creation request. The step width of durationSinceStart and durationUntilEnd may be computed by MnS producer 150 based on stepWidth and the total estimated download time.

In various embodiments, the FileDownloadMonitor object may contain the following attributes:

| Attribute name | Definition |
|---|---|
| status | Status of the file download process<br>Allowed values: NOT_STARTED, ONGOING, SUCCESS, FAILURE, CANCELLED |
| errorReason | Error Reason or code, only present when the file download failed and "status" = "FAILURE" |
| progress | Indicates what percent of the file is already downloaded, unit is percent<br>Allowed values: integer between 0 and 100 with increments of e.g. 5 |
| durationSinceStart | Indicates the time elapsed since the begin of the download process<br>Allowed values: format indicating valid time duratuon, e.g. ISO 8601 duration |
| durationUntilEnd | Indicates the estimated time until completion of the download<br>Allowed values: format indicating valid time duratuon, e.g. ISO 8601 duration |

In FIG. 1A at 4, MnS producer 150 may transmit a createMOI(FileDownloadJob(_linkToFileDownloadMonitor,_linkToCreateSu bscriptions,_linkToCancelDownload, . . . )) response to MnS consumer 140. In FIG. 1A at 5, MnS consumer 140 may store the returned links _linkToFileDownloadMonitor and _linkToCreateSubscriptions received from MnS producer 150.

Figure 5:
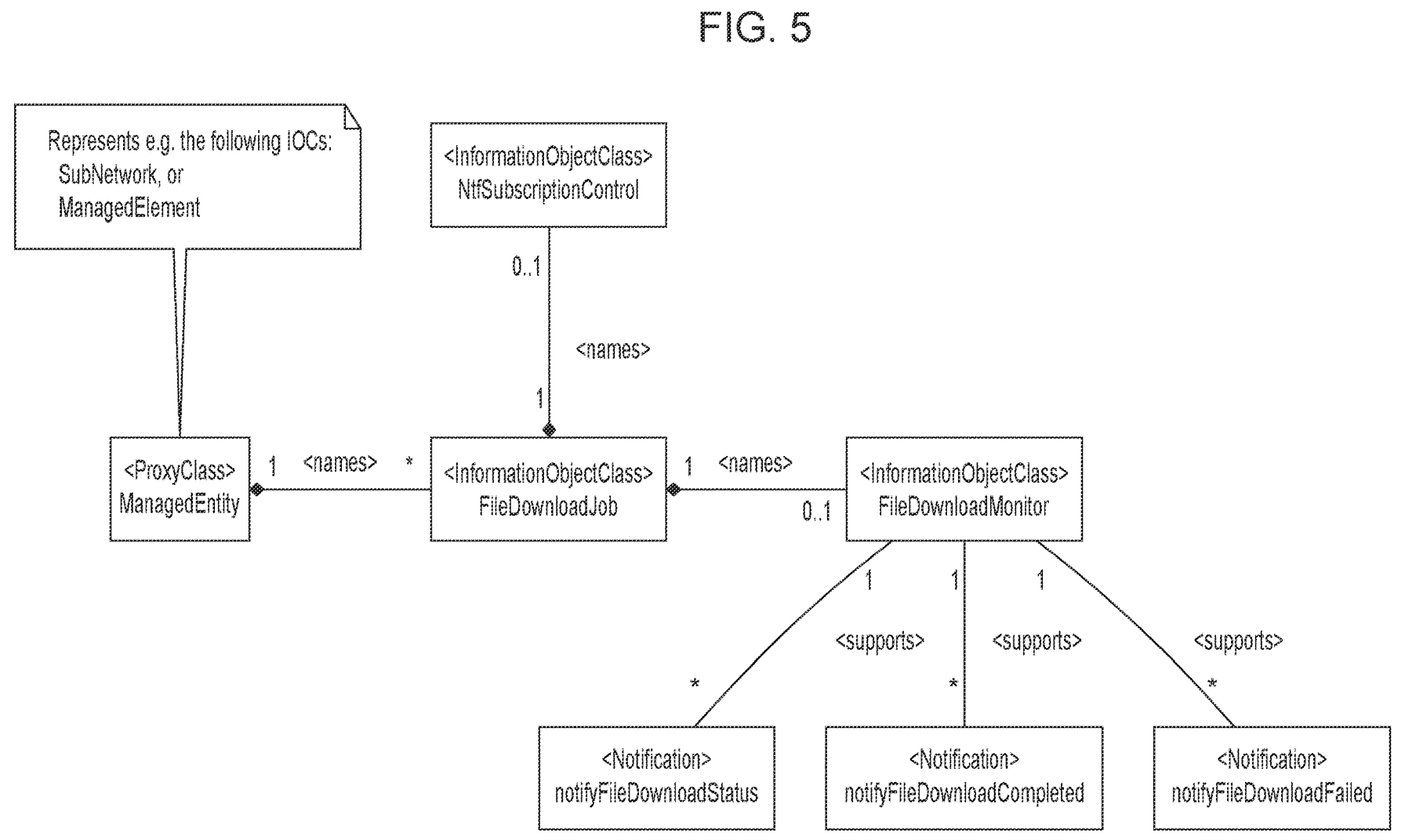

In FIG. 1A at 6, MnS consumer 140 may transmit a createMOI(NtfSubscriptionControl(notificationRecipientAddress,notificationT ypes,scope,notificationFilter)) request to MnS producer 150. In FIG. 1A at 7, MnS producer 150 may create a NtfSubscriptionControl object, such as illustrated in FIG. 5. In various embodiments, the FileDownloadJob object may include NtfSubscriptionControl (such as defined in 3GPP TS 28.622), which may be name-contained under SubNetwork and ManagedElement. NtfSubscriptionControl may also be name-contained under FileDownloadJob. This name-containment may scope notifications emitted by the base object (FileDownloadJob) and the object tree below (FileDownloadMonitor). By configuring the scope of NtfSubscriptionControl to the level below the base object, only the FileDownloadMonitor may be included in the subscription. When no FileDownloadMonitor is used, NtfSubscriptionControl may be name-contained under ManagedEntity. Additionally, the scope of the subscription may be configured to the level below ManagedEntity; it is noted that this level may have more objects than just the FileDownloadJob, requiring configuration of the filter of NtfSubscriptionControl. By subscribing either to the dedicated file download progress notifications or the generic configuration management notifications, MnS consumer 140 may implicitly instruct MnS producer 150 which notifications to use.

In some example embodiments, MnS producer 150 may send notifications with file download progress information to MnS consumer 140. In addition, MnS consumer 150 may read the file download status attributes as well. To receive notifications, a subscription NtfSubscriptionControl may need to be created. Two methods are available for creating subscriptions: first, MnS consumer 140 may create a NtfSubscriptionControl object on the MnS producer at the address specified by _linkToCreateSubscriptions that is returned in the FileDownloadJob creation response. Alternatively, MnS consumer 140 may request MnS producer 150 to create the NtfSubscriptionControl object by specifying the notificationRecipientAddress in the FileDownloadJob creation request. The information model may be designed in such a way to allow for using the existing generic configuration management notifications notifyMOIAttributeValueChanges, notifyMOIDeletion and notifyMOICreation. This allows for system designs that use only generic CRUD operations and generic configuration management notifications and where all the functions are baked into the information model. To allow the invention to cover also more classical designs, the dedicated notifications notifyFileDownloadStatusChanges, notifyFileDownloadCompletion and notifyFileDownloadFailure may be used as well.

In FIG. 1A at 8, MnS producer 150 may transmit a createMOI(NtfSubscriptionControl) response to MnS consumer 140. In FIG. 1A at 9, MnS consumer 140 may transmit a modifyMOIAttributes request to MnS producer 150. In FIG. 1A at 10, MnS producer 150 may transmit a modifyMOIAttributes response to MnS consumer 140.

Some various example embodiments may include downloading and status reporting. For example, in FIG. 1A at 11, MnS producer 150 may open a new file, and begin to download the file content.

The file download may start when the FileDownloadJob is created, and its administrativeState attribute may be set to UNLOCKED by MnS consumer 140. MnS consumer 140 may suspend the file download by setting the administrativeState attribute to LOCKED. For resuming the download, the attribute may be reset to UNLOCKED. MnS producer 150 may suspend the download as well. This might be useful for a number of reasons. For example, MnS producer 150 may give higher priority to other processes in overload situations, or MnS producer 150 may need to clean up its file system to free up space. MnS producer 150 suspending of the file download may be indicated by setting the operationalState attribute to DISABLED.

The creation request may contain all attributes required by MnS producer 150 to download the file: fileName, fileLocation, downloadProtocol, fileSize and fileCompressionType.

The MnS consumer may specify in the creation request as well a notificationRecipientAddress. When present, this may instruct MnS producer 150 to create automatically a subscription for the notifications supported by the FileDownloadMonitor. If MnS producer 150 may support both dedicated file download notifications and generic configuration management notifications it is up to the MnS producer to decide which ones to use. It is also possible to let MnS consumer 140 decide that by introducing a special selection attribute into the FileDownloadJob.

In various example embodiments, when no notification-RecipientAddress is present, MnS producer 150 may include in the creation response the link _linkToCreateSubscriptions to let MnS consumer 140 know where subscriptions can be created. Since MnS producer 150 cannot know if MnS consumer 140 will subscribe to notifications later, or if in some deployments notifications are not supported at all, MnS producer 150 may return the suggestedPollingInterval. This value may be a suggestion to MnS consumer 150 with which frequency it should poll (read) the file download status attributes. When MnS producer 150 create a dedicated download status monitor, it returns the address of this monitor as well (linkToFileDownloadMonitor) so that MnS consumer 150 may invoke Read operations on that object. Finally, file downloads can take quite some time until they terminate. For that reason, MnS consumer 150 may cancel an ongoing download process. The link to do so may be returned in linkToCancelDownload.

In FIG. 1B at 12, MnS producer 150 may update attributes of the FileDownloadMonitor based upon the progress of the file download. In FIG. 1B at 13, MnS producer 150 may transmit a notifyMOIAttributeValueChange(FileDownload-Monitor) message to MnS consumer 140. In FIG. 1B at 14, MnS producer 150 may transmit a notifyFileDownloadSta-tusChanges(FileDownloadMonitor) to MnS consumer 140.

In various example embodiments, MnS consumer 140 may read the attributes of the FileDownloadMonitor. For example, in FIG. 1B at 15, MnS consumer 140 may transmit a getMOIAttribute(FileDownloadMonitor) request to MnS producer 150, which may be sent to _linkToFileDownload-Monitor returned in the file download job. In FIG. 1B at 16, MnS producer 150 may transmit a getMOIAttribute(File-DownloadMonitor) response to MnS consumer 140.

In certain example embodiments, MnS consumer 140 may suspend the file download. For example, in FIG. 1B at 17, MnS consumer 140 may transmit to MnS producer 150 a modifyMOIAttributes(FileDownloadJob (adminstrativeState=LOCKED) request to MnS producer 150, and in FIG. 1B at 18, MnS consumer 140 may transmit a modifyMOIAttributes(FileDownloadJob) response to MnS consumer 140. In FIG. 1B at 19, MnS consumer 140 may transmit a modifyMOIAttributes(FileDownloadJob (adminstrativeState=UNLOCKED) request to MnS pro-ducer 150, which in FIG. 1B at 20, may transmit a modi-fyMOIAttributes(FileDownloadJob) response to MnS consumer 140.

Figure 1C:
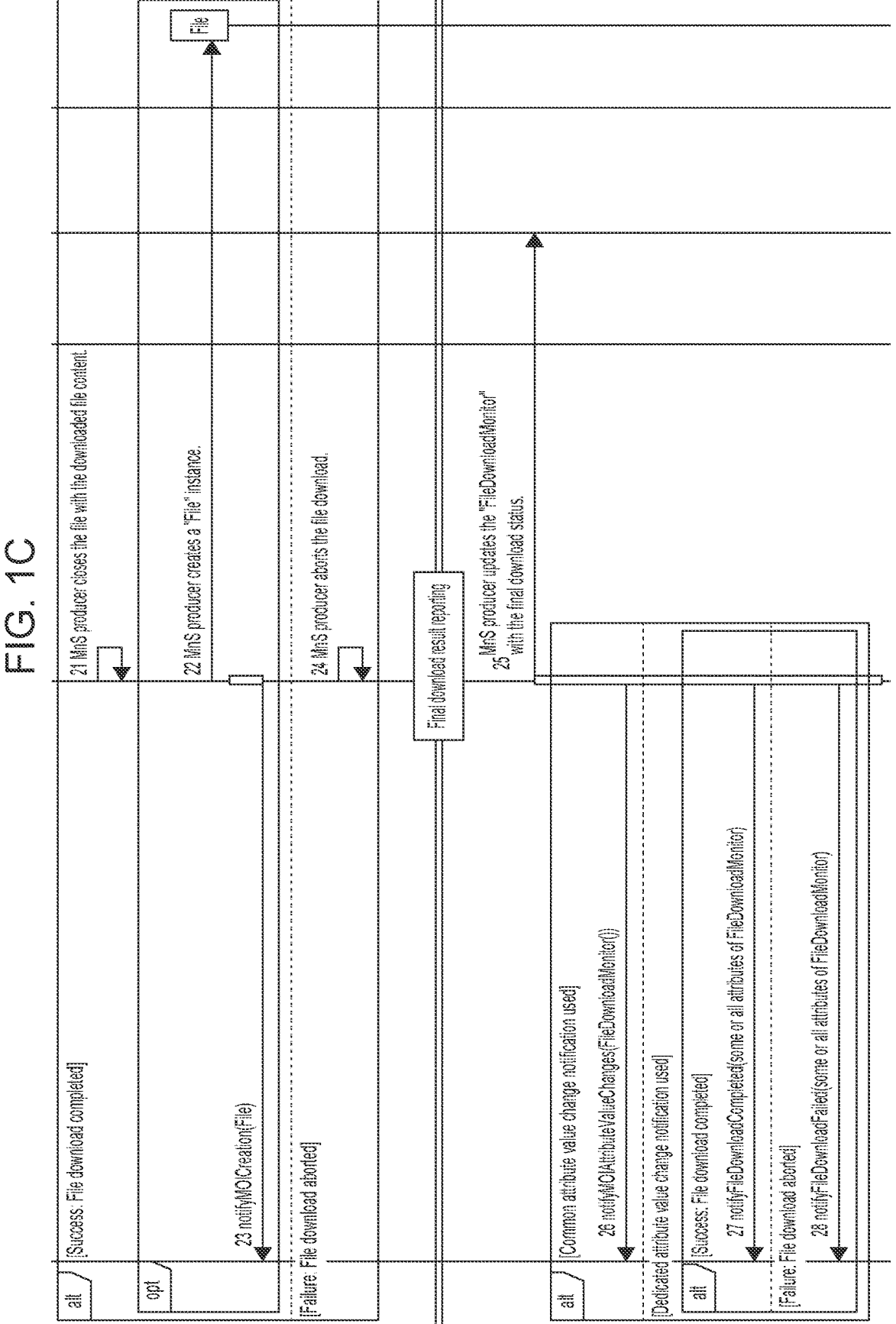

In various example embodiments, the file download may reach completion. In FIG. 1C at 21, MnS producer 150 may close the file with the downloaded file content, and in FIG. 1C at 22, may create a "File" instance. For example, upon successful completion of the file download, MnS producer 150 may create a File object representing the file. In FIG. 1C at 23, MnS producer 150 may transmit a notifyMOICreation (File) to MnS consumer 140.

In some example embodiments, the file download may be aborted due to failure. For example, in FIG. 1C at 24, MnS producer 150 may abort the file download. In various example embodiments, to cancel an ongoing file download process (status=ONGOING) or a file download process not started yet (status=NOT_STARTED), MnS consumer 140 may delete the FileDownloadMonitor, or when no monitor is used, the FileDownloadJob. In another variant, MnS consumer 140 may delete both the FileDownloadMonitor and FileDownloadJob. It is also possible to include a dedi-cated attribute cancelFileDownload in the job or monitor that needs to be set to TRUE to cancel the download. The attribute _linkToCancelDownload is returned in the File-DownloadJob creation response. This may allow for the implementation of lightweight MnS consumers that are driven by hypermedia only, and do not need to be pre-programmed with the knowledge how to cancel file down-load jobs. The link may be accompanied by more instruc-tions, for example the method to use for the deletion such as HTTP DELETE or HTTP PATCH for setting cancelFile-Download to TRUE.

In various example embodiments, the finalizing of the download may be reported. For example, in FIG. 1C at 25, MnS producer 150 may update the FileDownloadMonitor, and in FIG. 1C at 26, MnS producer 150 may transmit to MnS consumer 140 a notifyMOIAttributeValueChanges (FileDownloadMonitoro). In FIG. 1C at 27, MnS producer 150 may transmit to MnS consumer 140 a notifyFileDown-loadCompleted(some or all attributes of FileDownload-Monitor). In FIG. 1C at 28, MnS producer 150 may transmit to MnS producer 140 a notifyFileDownloadFailed(some or all attributes of FileDownloadMonitor). It is possible to keep the FileDownloadJob and FileDownloadMonitor as log resources for old requests. In this case, the FileDownloadJob or FileDownloadMonitor cannot be deleted for indicating to MnS producer 150 to cancel the file download job, and the cancelFileDownload attribute needs to be used instead.

Figure 1D:
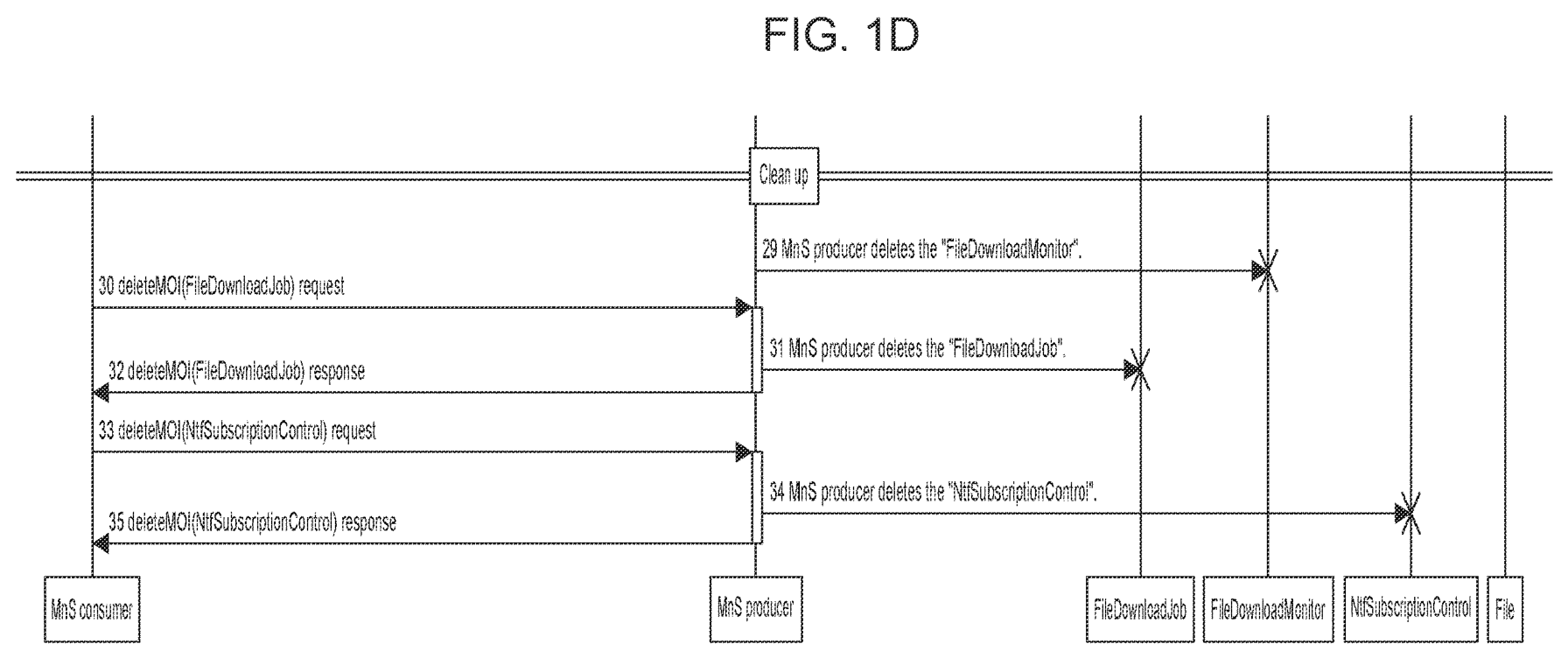

Various example embodiments may include a clean up procedure. For example, in FIG. 1D at 29, MnS producer 150 may delete the FileDownloadMonitor, and in FIG. 1D at 30, may transmit a deleteMOI(FileDownloadJob) request to MnS consumer 140. In FIG. 1D at 31, MnS producer 150 may transmit delete the FileDownloadJob, and in FIG. 1D at 32, may delete deleteMOI(FileDownloadJob) response to MnS consumer 140.

In FIG. 1D at 33, MnS producer 140 may transmit a deleteMOI(NtfSubscriptionControl) request to MnS con-sumer 150. In FIG. 1D at 34, MnS producer 150 may delete the NtfSubscriptionControl, and in FIG. 1D at 35, may transmit a deleteMOI(NtfSubscriptionControl) response to MnS consumer 140.

FIGS. 2A-2D an example of a signaling diagram depict-ing for downloading files from a MnS consumer to a MnS producer, which may be similar to the procedure described in FIGS. 1A-1D. MnS 230 and MnS producer 240 may be similar to UE 910 and NE 920, as illustrated in FIG. 9, according to certain example embodiments.

Figure 2A:
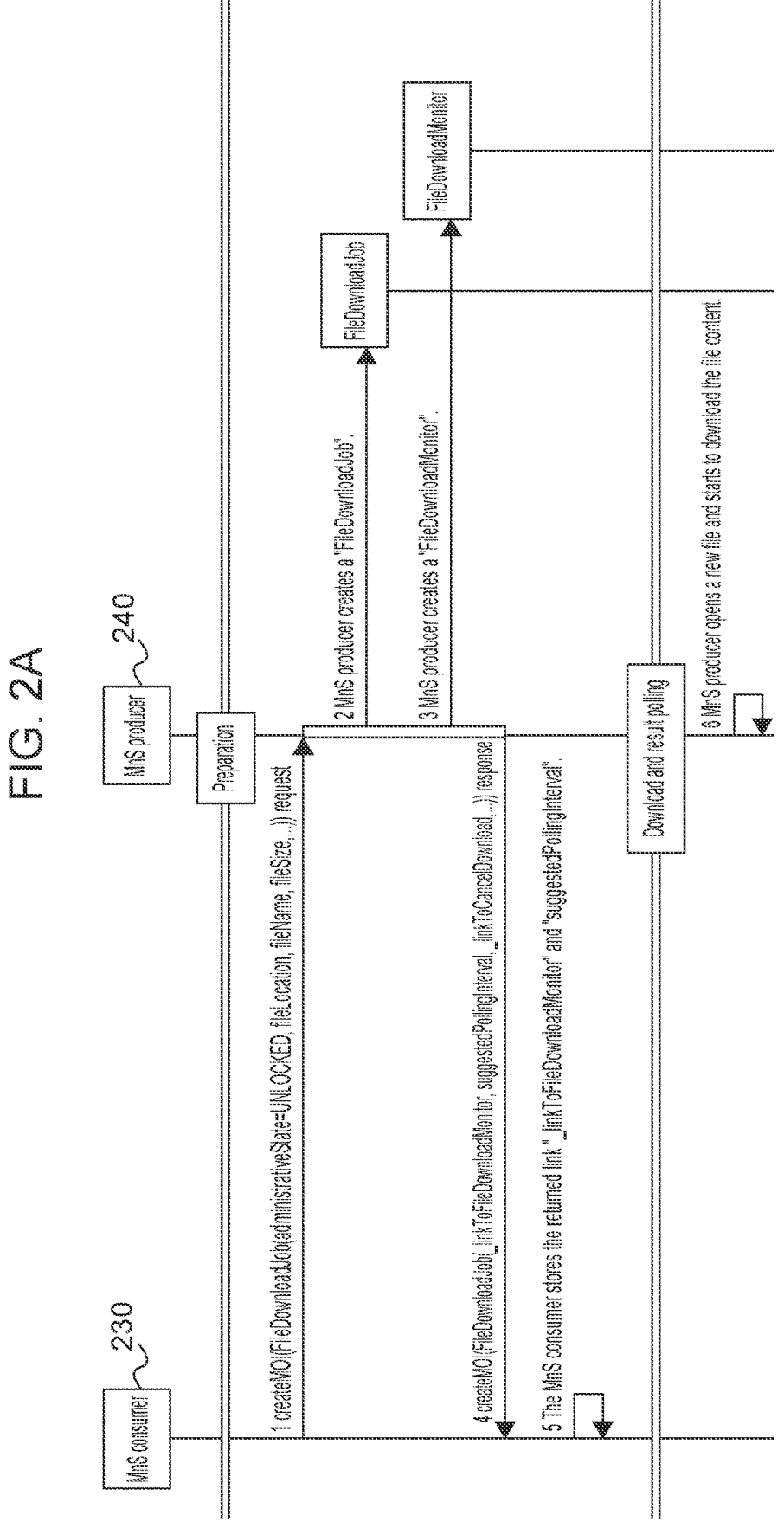

In FIG. 2A at 1, MnS consumer 230 may transmit a request, such as createMOI(FileDownloadJob (administrativeState=LOCKED, filelocation, filename, file-Size . . . )) request, to create a file download job object associated with a file download job to MnS producer 240. For requesting MnS producer 240 to create the object, a normal Create operation may be used.

In FIG. 2A at 2, MnS producer 240 may create a File-DownloadJob object. In some example embodiments, the FileDownloadJob object may be name-contained under many object types. The exact location may depend on the context within which a file download is requested. For example, for software downloaded onto a base transceiver station (BTS), the FileDownloadJob may be name-contained under ManagedElement, or for software download, onto an Element Manager under SubNetwork or ManagementNode. For downloading a beamforming configuration file, the FileDownloadJob may be name-contained under a resource representing the base station (BTS) or radio unit (RU). For downloading a certificate file, the FileDownloadJob may be name-contained under a resource representing the Trust Store for the appropriate managed object. For downloading a ML model file, the FileDownloadJob may be name-contained under a resource representing the ML application that uses this ML model.

In some certain example embodiments, the FileDownloadJob may contain all attributes required by MnS producer 240 to download the file, including file name and location (address), provided for FTP and HTTP in the format of a URI (which may be defined in RFC3986); protocols supported for retrieving the files (FTP/SFTP/FTPES or HTTP GET/HTTPS GET); file size; and/or compression type.

In various example embodiments, the FileDownloadJob may include state attributes such as administrativeState, allowed values: LOCKED, UNLOCKED; and operationalState, allowed values: DISABLED, ENABLED, which may be defined in ITU-T X.731. The FileDownloadJob may further include links such as _linkToCreate Subscriptions, _linkToCreatedSubscription, _linkToFileDownloadMonitor, and _linkToCancelDownload. Furthermore, the FileDownloadJob may support alarm notifications, such as those defined in 3GPP TS 28.532, which may enable reporting alarms related to the file download process.

The FileDownloadJob object may comprise any of the following parameters:

target content; estimated time remaining until the file is fully downloaded and closed; the file is closed and contains 100% of its target content; and/or the duration the download process is already running.

In some various example embodiments, when MnS consumer 230 does not provide a notificationRecipientAddress for implicit notification subscription or does not subscribe to notifications using the normal mechanism, MnS producer 240 may not send notifications with file download status information. Some deployments may not support notifications at all. The MnS consumer 230 may read, using a normal Read operation, the attributes of the FileDownloadMonitor with the frequency suggested by suggestedPollingInterval. In case the status attributes are integrated into the FileDownloadJob, MnS consumer 230 may need to read the status attributes there.

In some example embodiments, FileDownloadMonitor may include status attributes such as status, allowed values: NOT_STARTED, ONGOING, SUCCESS, FAILURE; errorReason: allowed values: string or standardized error reasons/codes, present only when status=FAILURE; progress, allowed values: integer between 0 and 100 with increments of e.g., 5, unit is percent; durationSinceStart, allowed avalues are e.g., according to ISO 8601 duration; and/or

| Attribute name | Present in creation request | Present creation in response | Definition |
|---|---|---|---|
| operationalState | No | Yes | Operational state |
| administrative State | Yes | Yes | Administrative state |
| fileName | Yes | Yes | Name of the file to be downloaded |
| fileLocation | Yes | Yes | Location of the file to be downloaded |
| downloadProtocol | Yes | Yes | Protocol to be used for the download |
| fileSize | Yes | Yes | Size of the file |
| fileCompressionType | Yes | Yes | Compression type of the file |
| step Width | Yes | Yes | Step width for the values of the "progress" attribute |
| notificationRecipientAddress | Yes | Yes | Notification recipient address, present in the creation request when the MnS producer requests an implicit notification subscription |
| suggestedPollingInterval | No | Yes | Suggested period for polling the status attributes |
| cancelFileDownload | No | No | Attribute, when set to "TRUE", indicates to the MnS producer to cancel a file download. Only used when the job and monitor resources are persisted for log purposes. |
| _linkToCreate Subscriptions | No | Yes | Link where notification subscriptions can be created, present in the creation response only when no implicit notification subscription is requested |
| _linkToCreatedSubscription | No | Yes | Link to the subscription created by the MnS producer when implicit notification subscription is requested. The MnS consumer may use this link to modify the subscription. Note the subscription is deleted automatically by the MnS producer for implicit subscriptions. |
| _linkToFileDownloadMonitor | No | Yes | Link to the "FileDownLoadMonitor", present in the creation response only when a "FileDownloadMonitor" is used by the MnS producer |
| _linkToCancelDownload | No | Yes | Link to cancel the download process |

In FIG. 2A at 3, MnS producer 240 may create a FileDownloadMonitor object. In various example embodiments, the FileDownloadMonitor object may hold the status of the file download job, allowing MnS consumer to monitor the file download progress. It is created by the MnS producer. Its attributes are populated and updated by MnS producer 240 as the file download progresses. In addition, the FileDownloadMonitor object may be name-contained by a FileDownloadJob. The FileDownloadMonitor object may also be name-contained by any other object, if it has a relationship (pointer) to the related FileDownloadJob. The status and progress attributes of the FileDownloadMonitor may expose information such as the file is open and contains x % of its durationUntilEnd, allowed avalues are e.g., according to ISO 8601 duration. The attributes progress, durationSinceStart and durationUntilEnd may be modified in discrete steps only where the step width is chosen by MnS producer 240 in a way as to not overload MnS consumer 230 with too much and frequent information on the progress. With stepWidth, the step width of the progress attribute may be selected also by MnS consumer 230 in the FileDownloadRequest creation request. The step width of durationSinceStart and durationUntilEnd may be computed by MnS producer 240 based on stepWidth and the total estimated download time.

In various embodiments, the FileDownloadMonitor object may contain the following attributes:

| Attribute name | Definition |
|---|---|
| status | Status of the file download process<br>Allowed values: NOT_STARTED, ONGOING, SUCCESS, FAILURE, CANCELLED |
| errorReason | Error Reason or code, only present when the file download failed and "status" = "FAILURE" |
| progress | Indicates what percent of the file is already downloaded, unit is percent<br>Allowed values: integer between 0 and 100 with increments of e.g. 5 |
| durationSinceStart | Indicates the time elapsed since the begin of the download process<br>Allowed values: format indicating valid time duratuon, e.g. ISO 8601 duration |
| durationUntilEnd | Indicates the estimated time until completion of the download<br>Allowed values: format indicating valid time duratuon, e.g. ISO 8601 duration |

In FIG. 2A at 4, MnS producer 240 may transmit a createMOI(FileDownloadJob(_linkToFileDownloadMonitor,_linkToCreateSu bscriptions,_linkToCancelDownload, . . . )) response to MnS consumer 230. In FIG. 2A at 5, MnS consumer 230 may store the returned links _linkToFileDownloadMonitor and _linkToCreateSubscriptions received from MnS producer 240.

Some various example embodiments may include downloading and status reporting. For example, in FIG. 2A at 6, MnS producer 240 may open a new file, and begin to download the file content.

The file download may start when the FileDownloadJob is created, and its administrativeState attribute may be set to UNLOCKED by MnS consumer 240. MnS consumer 240 may suspend the file download by setting the administrativeState attribute to LOCKED. For resuming the download, the attribute may be reset to UNLOCKED. MnS producer 250 may suspend the download as well. This might be useful for a number of reasons. For example, MnS producer 250 may give higher priority to other processes in overload situations, or MnS producer 250 may need to clean up its file system to free up space. MnS producer 250 suspending of the file download may be indicated by setting the operationalState attribute to DISABLED.

The creation request may contain all attributes required by MnS producer 240 to download the file: fileName, fileLocation, downloadProtocol, fileSize and fileCompressionType.

MnS consumer 230 may specify in the creation request as well a notificationRecipientAddress. When present, this may instruct MnS producer 240 to create automatically a subscription for the notifications supported by the FileDownloadMonitor. If MnS producer 240 may support both dedicated file download notifications and generic configuration management notifications it is up to MnS producer 240 to decide which ones to use. It is also possible to let MnS consumer 230 decide that by introducing a special selection attribute into the FileDownloadJob.

In various example embodiments, when no notificationRecipientAddress is present, MnS producer 240 include in the creation response the link _linkToCreateSubscriptions to let MnS consumer 230 know where subscriptions can be created. Since MnS producer 240 cannot know if MnS consumer 230 will subscribe to notifications later, or if in some deployments notifications are not supported at all, MnS producer 240 may return the suggestedPollingInterval. This value may be a suggestion to MnS consumer 230 with which frequency it should poll (read) the file download status attributes. When MnS producer 240 create a dedicated download status monitor, it returns the address of this monitor as well (_linkToFileDownloadMonitor) so that MnS consumer 230 may invoke Read operations on that object. Finally, file downloads can take quite some time until they terminate. For that reason, MnS consumer 230 may cancel an ongoing download process. The link to do so may be returned in linkToCancelDownload.

Figure 2B:
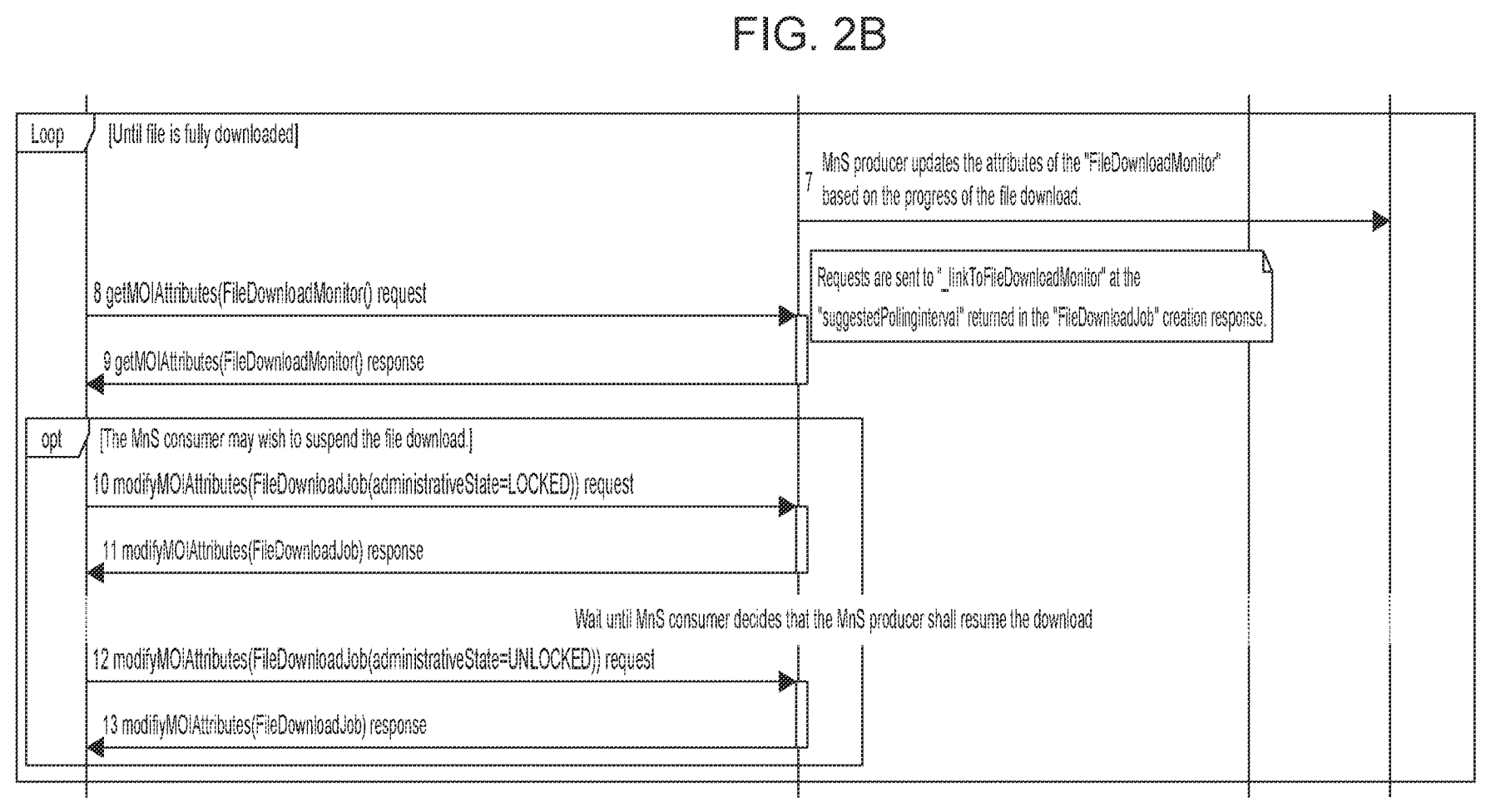

In FIG. 2B at 7, MnS producer 240 may update attributes of the FileDownloadMonitor based upon the progress of the file download. In FIG. 2B at 8, MnS producer 150 may transmit a getMOIAttributes(FileDownloadMonitor) request to MnS consumer 230. In FIG. 2B at 9, MnS producer 240 may transmit a getMOIAttributes(FileDownloadMonitor) to MnS consumer 230.

In various example embodiments, MnS consumer 230 may read the attributes of the FileDownloadMonitor. For example, in FIG. 2B at 10, MnS consumer 230 may transmit a modifyMOIAttributes(FileDownloadJob (administrativeState=LOCKED)) request to MnS producer 240. In FIG. 2B at 11, MnS producer 240 may transmit a modifyMOIAttributes(FileDownloadJob) response to MnS consumer 230.

In certain example embodiments, MnS consumer 230 may suspend the file download. For example, in FIG. 2B at 12, MnS consumer 230 may transmit to MnS producer 240 a modifyMOIAttributes(FileDownloadJob (adminstrativeState=LOCKED) request to MnS producer 240, and in FIG. 2B at 13, MnS producer 240 may transmit a modifyMOIAttributes(FileDownloadJob) response to MnS consumer 230.

Figure 2C:
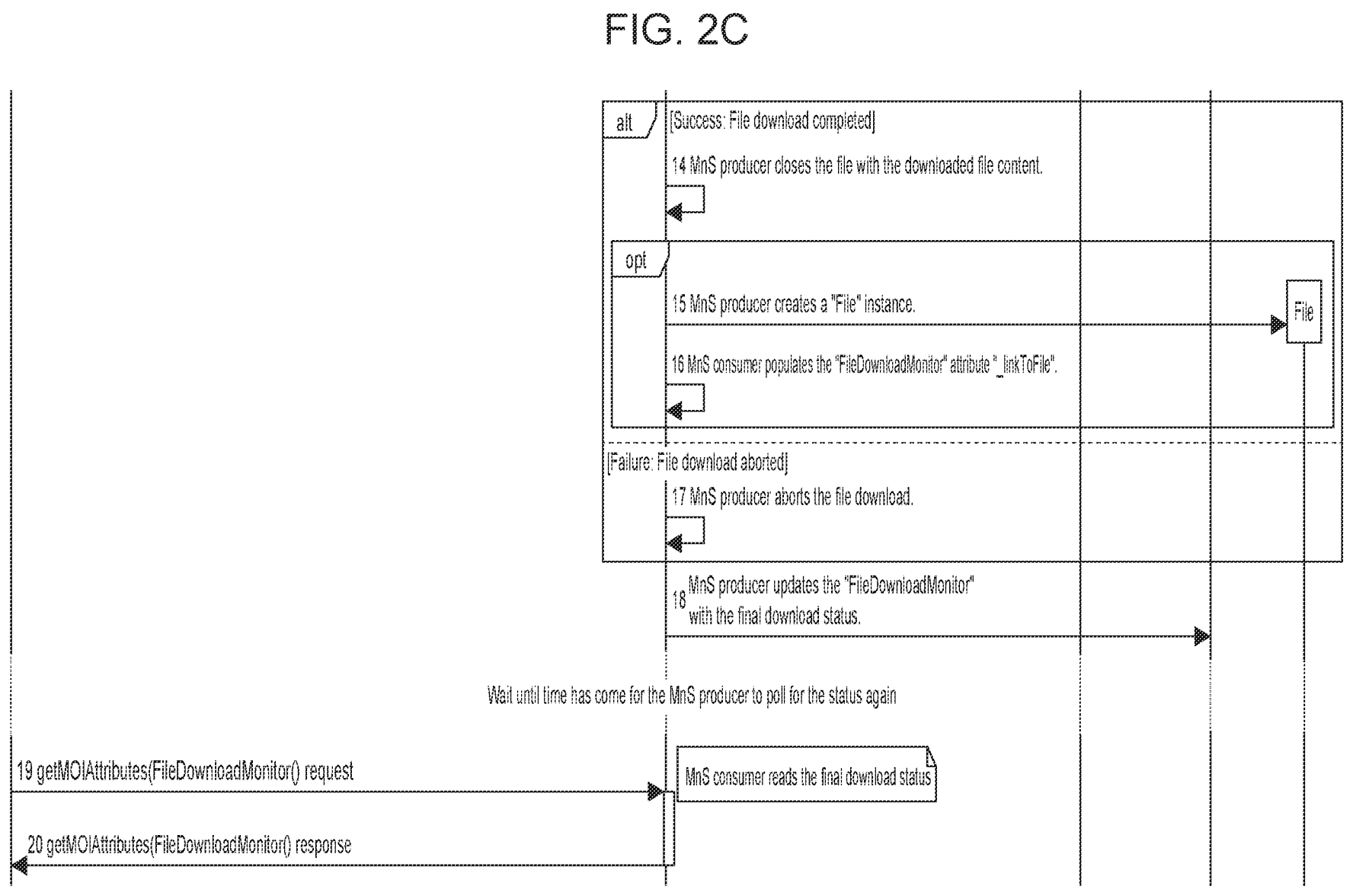

In FIG. 2C at 14, MnS producer 240 may close the file with the downloaded file content, and in FIG. 2C at 15, may create a File instance. In FIG. 2C at 16, MnS producer 240 may populate the FileDownloadMonitor attribute _linkToFile. In FIG. 2C at 17, MnS producer 240 may abort the file download, and in FIG. 2C at 18, MnS producer 240 may update the FileDownloadMonitor with the final download status.

Figure 2D:
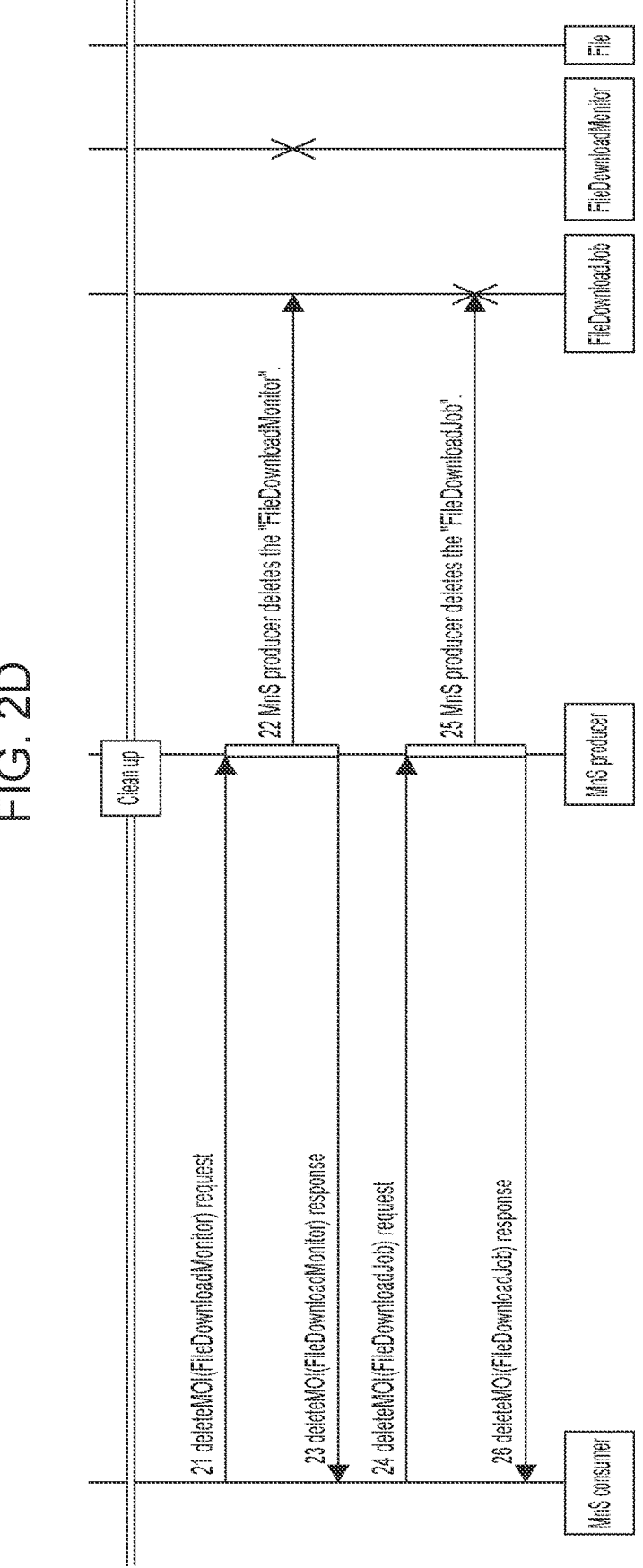

In FIG. 2C at 19, MnS consumer 230 may transmit to MnS producer 240 a getMOIAttributes(FileDownloadMonitor( ) request, and in FIG. 2C at 20, MnS producer 240 may transmit to MnS consumer 230 a getMOIAttributes(FileDownloadMonitor( ) response. In FIG. 2D at 21, MnS consumer 230 may transmit to deleteMOI(FileDownloadMonitor) request to MnS producer 240, and in FIG. 2D at 22, MnS producer 240 may delete the FileDownloadMonitor. In FIG. 2D at 23, MnS producer 240 may transmit to MnS consumer 230 a deleteMOI(FileDownloadMonitor) response, and in FIG. 2D at 24, MnS consumer 230 may transmit to MnS producer 240 a deleteMOI(FileDownloadJob) request. In FIG. 2D at 25, MnS producer 240 may delete the FileDownloadJob, and in FIG. 2D at 26, may transmit a deleteMOI(FileDownloadJob) response to MnS consumer 230.

Figure 3A:
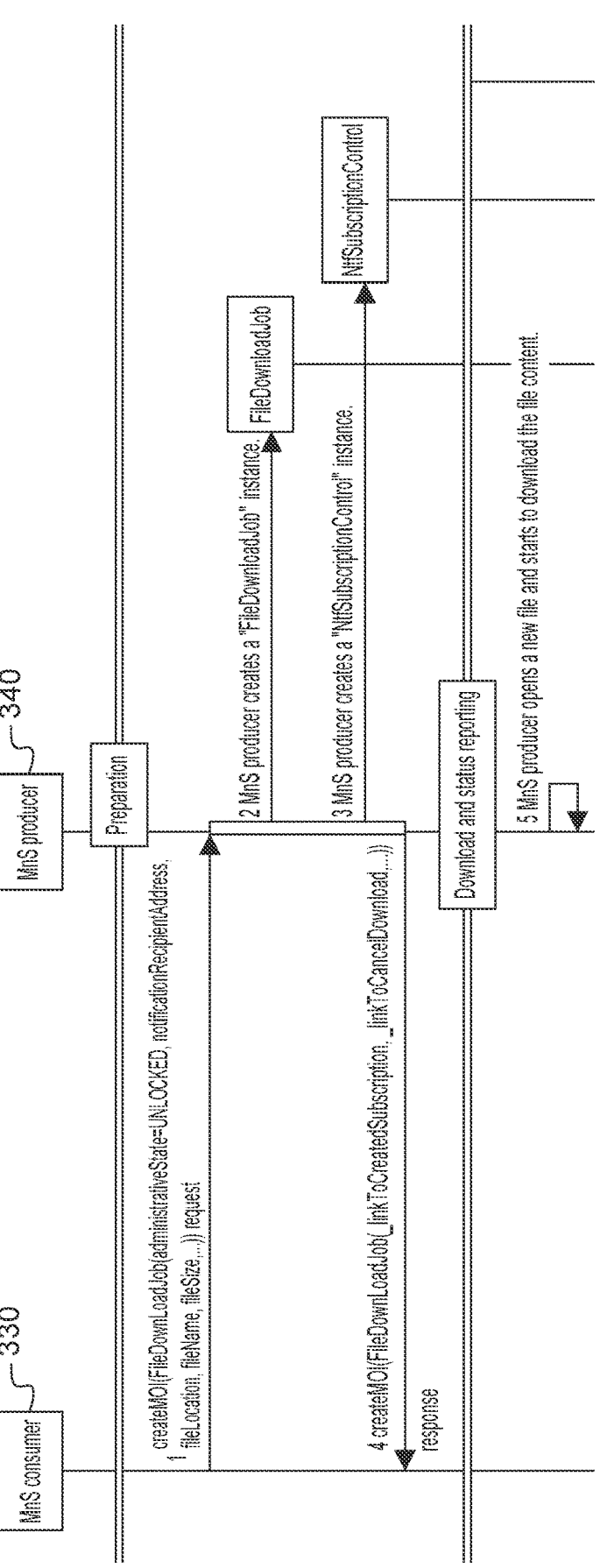
Figure 3B:
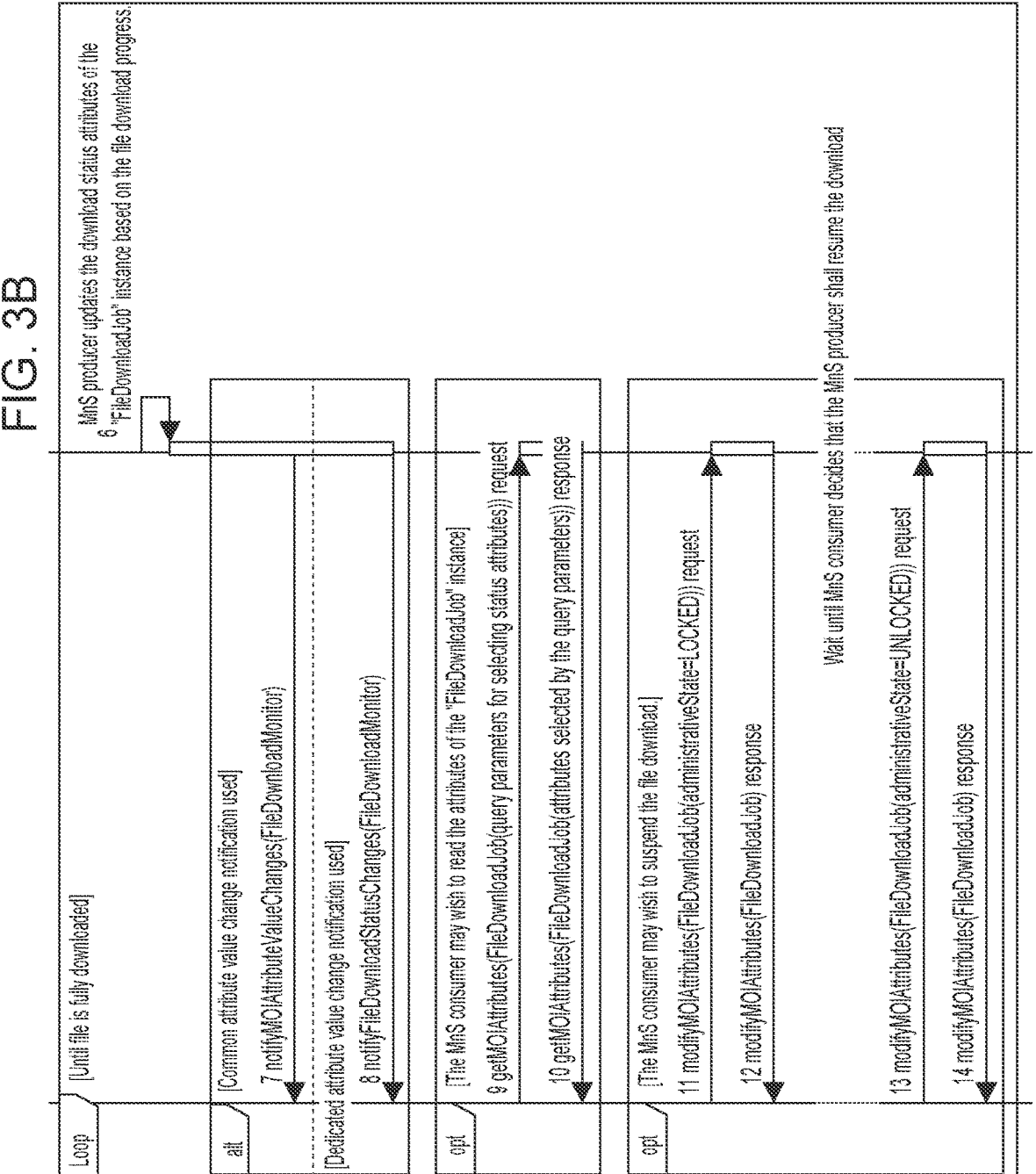
Figure 3C:
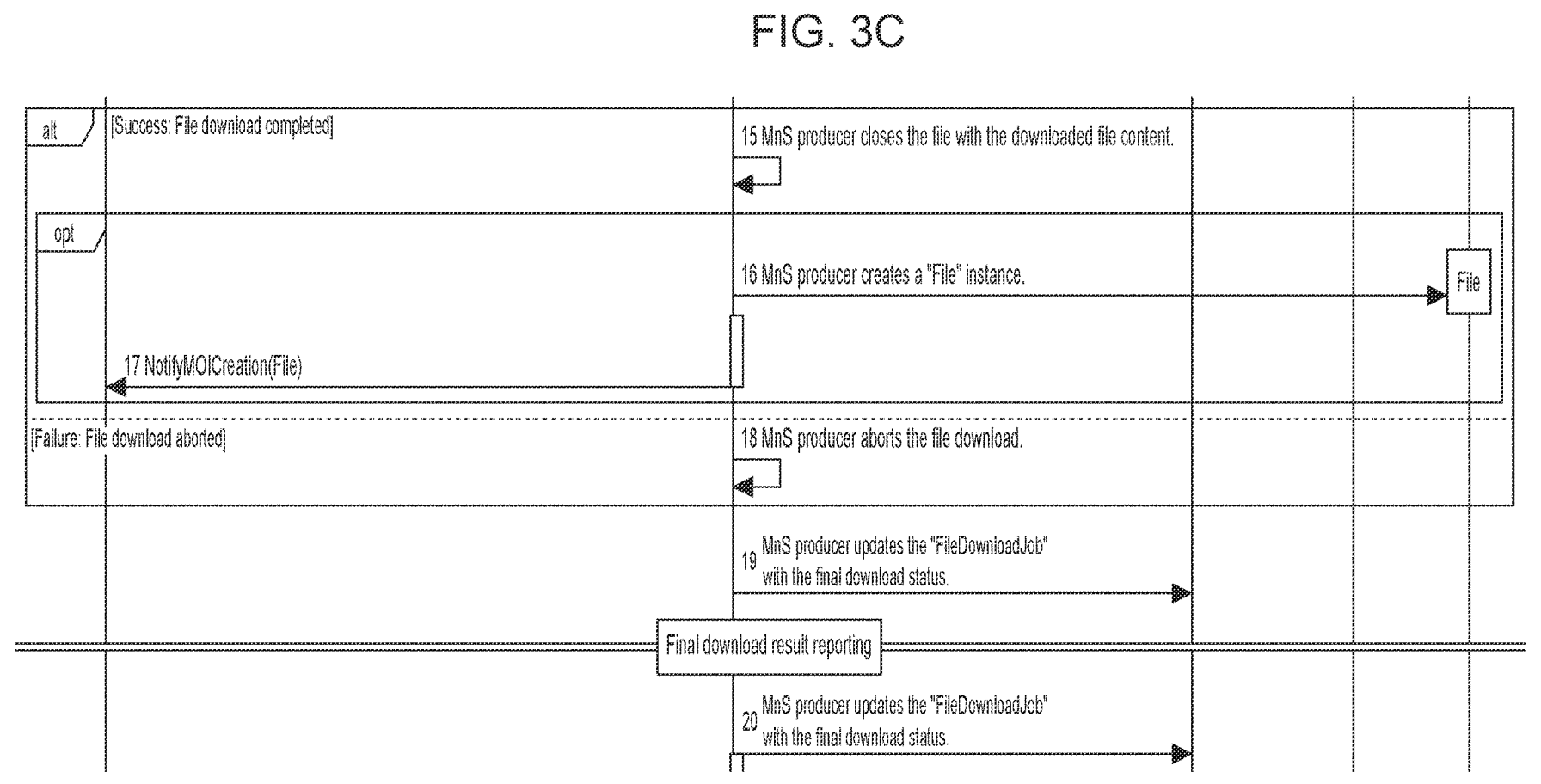

FIGS. 3A-3C illustrate an example of a signaling diagram depicting for downloading files from a MnS consumer to a MnS producer, which may be similar to the procedure described in FIGS. 1A-1D and 2A-2D. MnS 330 and MnS producer 340 may be similar to UE 910 and NE 920, as illustrated in FIG. 9, according to certain example embodiments.

In FIG. 3A at 1, MnS consumer 330 may transmit a request, such as createMOI(FileDownloadJob (administrativeState=UNLOCKED, notificationRecipientAddress, filelocation, filename, fileSize . . . )) request, to create a file download job object associated with a file download job to MnS producer 340. For requesting MnS producer 340 to create the object, a normal Create operation may be used.

In FIG. 3A at 2, MnS producer 340 may create a File-DownloadJob object. In some example embodiments, the In some certain example embodiments, the FileDownloadJob may contain all attributes required by the MnS producer to download the file, including file name and location (address), provided for FTP and HTTP in the format of a URI (which may be defined in RFC3986); protocols supported for retrieving the files (FTP/SFTP/FTPES or HTTP GET/HTTPS GET); file size; and/or compression type.

In various example embodiments, the FileDownloadJob may include state attributes such as administrativeState, allowed values: LOCKED, UNLOCKED; and operationalState, allowed values: DISABLED, ENABLED, which may be defined in ITU-T X.731. The FileDownloadJob may further include links such as _linkToCreateSubscriptions, _linkToCreatedSubscription, _linkToFileDownloadMonitor, and _linkToCancelDownload. Furthermore, the FileDownloadJob may support alarm notifications, such as those defined in 3GPP TS 28.532, which may enable reporting alarms related to the file download process.

The FileDownloadJob object may comprise any of the following parameters:

| Attribute name | Present in creation request | Present in creation response | Definition |
|---|---|---|---|
| operationalState | No | Yes | Operational state |
| administrative State | Yes | Yes | Administrative state |
| fileName | Yes | Yes | Name of the file to be downloaded |
| fileLocation | Yes | Yes | Location of the file to be downloaded |
| downloadProtocol | Yes | Yes | Protocol to be used for the download |
| fileSize | Yes | Yes | Size of the file |
| fileCompressionType | Yes | Yes | Compression type of the file |
| step Width | Yes | Yes | Step width for the values of the "progress" attribute |
| notificationRecipientAddress | Yes | Yes | Notification recipient address, present in the creation request when the MnS producer requests an implicit notification subscription |
| suggestedPollingInterval | No | Yes | Suggested period for polling the status attributes |
| cancelFileDownload | No | No | Attribute, when set to "TRUE", indicates to the MnS producer to cancel a file download. Only used when the job and monitor resources are persisted for log purposes. |
| _linkToCreate Subscriptions | No | Yes | Link where notification subscriptions can be created, present in the creation response only when no implicit notification subscription is requested |
| _linkToCreatedSubscription | No | Yes | Link to the subscription created by the MnS producer when implicit notification subscription is requested. The MnS consumer may use this link to modify the subscription. Note the subscription is deleted automatically by the MnS producer for implicit subscriptions. |
| _linkToFileDownloadMonitor | No | Yes | Link to the "FileDownLoadMonitor", present in the creation response only when a "FileDownloadMonitor" is used by the MnS producer |
| _linkToCancelDownload | No | Yes | Link to cancel the download process |

FileDownloadJob object may be name-contained under many object types. The exact location may depend on the context within which a file download is requested. For example, for software downloaded onto a base transceiver station (BTS), the FileDownloadJob may be name-contained under ManagedElement, or for software download, onto an Element Manager under SubNetwork or ManagementNode. For downloading a beamforming configuration file, the FileDownloadJob may be name-contained under a resource representing the base station (BTS) or radio unit (RU). For downloading a certificate file, the FileDownloadJob may be name-contained under a resource representing the Trust Store for the appropriate managed object. For downloading a ML model file, the FileDownloadJob may be name-contained under a resource representing the ML application that uses this ML model.

Figure 7:
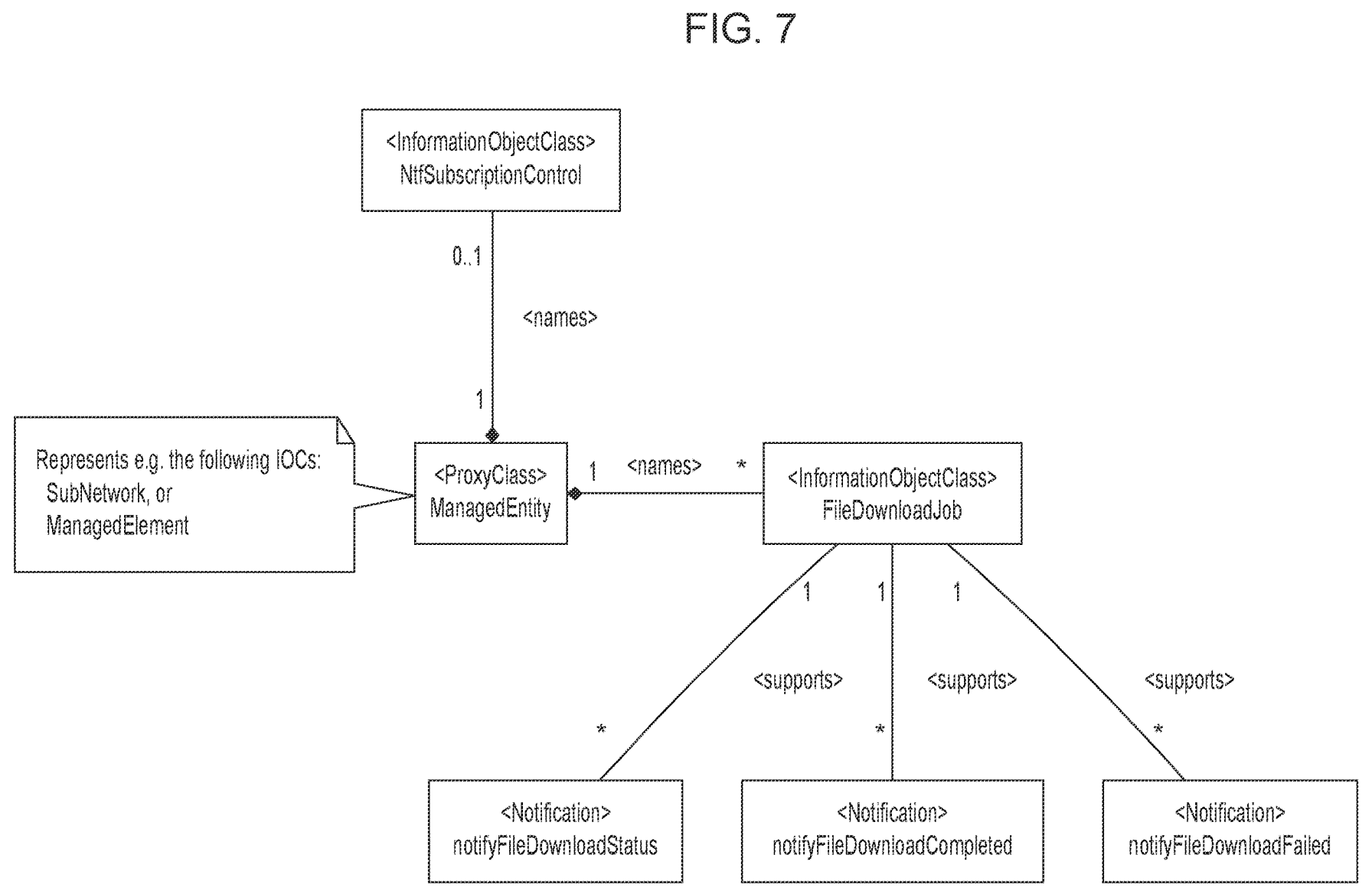

In FIG. 3A at 3, MnS producer 340 may create a NtfSubscriptionControl, such as illustrated in FIG. 7. In various example embodiments, the FileDownloadMonitor object may hold the status of the file download job, allowing MnS consumer 330 to monitor the file download progress. It is created by the MnS producer. Its attributes are populated and updated by the MnS producer as the file download progresses. In addition, the FileDownloadMonitor object may be name-contained by a FileDownloadJob. The FileDownloadMonitor object may also be name-contained by any other object, if it has a relationship (pointer) to the related FileDownloadJob. The status and progress attributes of the FileDownloadMonitor may expose information such as the file is open and contains x % of its target content; estimated time remaining until the file is fully downloaded and closed; the file is closed and contains 100% of its target content; and/or the duration the download process is already running.

In some various example embodiments, when MnS consumer 330 does not provide a notificationRecipientAddress for implicit notification subscription or does not subscribe to notifications using the normal mechanism, MnS producer 340 may not send notifications with file download status information. Some deployments may not support notifications at all. The MnS consumer 330 may read, using a normal Read operation, the attributes of the FileDownload-Monitor with the frequency suggested by suggestedPollingInterval. In case the status attributes are integrated into the FileDownloadJob, MnS consumer 330 may need to read the status attributes there.

In some example embodiments, FileDownloadMonitor may include status attributes such as status, allowed values: NOT_STARTED, ONGOING, SUCCESS, FAILURE; errorReason: allowed values: string or standardized error reasons/codes, present only when status=FAILURE; progress, allowed values: integer between 0 and 100 with increments of e.g., 5, unit is percent; durationSinceStart, allowed avalues are e.g., according to ISO 8601 duration; and/or durationUntilEnd, allowed avalues are e.g., according to ISO 8601 duration. The attributes progress, durationSinceStart and durationUntilEnd may be modified in discrete steps only where the step width is chosen by MnS producer 340 in a way as to not overload MnS consumer 330 with too much and frequent information on the progress. With stepWidth, the step width of the progress attribute may be selected also by MnS consumer 330 in the FileDownloadRequest creation request. The step width of durationSinceStart and durationUntilEnd may be computed by MnS producer 340 based on stepWidth and the total estimated download time.

In various embodiments, the FileDownloadMonitor object may contain the following attributes:

| Attribute name | Definition |
| --- | --- |
| status | Status of the file download process<br>Allowed values: NOT_STARTED, ONGOING, SUCCESS, FAILURE, CANCELLED |
| errorReason | Error Reason or code, only present when the file download failed and "status" = "FAILURE" |
| progress | Indicates what percent of the file is already downloaded, unit is percent<br>Allowed values: integer between 0 and 100 with increments of e.g. 5 |
| durationSinceStart | Indicates the time elapsed since the begin of the download process<br>Allowed values: format indicating valid time duratuon, e.g. ISO 8601 duration |
| durationUntilEnd | Indicates the estimated time until completion of the download<br>Allowed values: format indicating valid time duratuon, e.g. ISO 8601 duration |

In FIG. 3 at 4, Mn producer 340 may transmit a createMOI(FileDownloadJob(_linkToCreatedSubscription,_ linkToCancelDow nload, . . . )) response to MnS consumer 330.

In FIG. 3A at 5, MnS producer 340 may open a new file and start to download the file content. In FIG. 3B at 6, MnS producer 340 may update the download status attributes of the FileDownloadJob instance based on the file download progress. In FIG. 3B at 7, MnS producer 340 may transmit a notifyMOIAttributeValueChanges(FileDownloadMonitor) to MnS consumer 330. In FIG. 3B at 8, MnS producer 340 may transmit to notifyFileDownloadStatusChanges(FileDownloadMonitor). In FIG. 3B at 9, MnS consumer 330 may transmit to MnS producer 340 a getMOIAttributes(FileDownloadJob(query parameters for selecting status attributes)) request. In FIG. 3B at 10, MnS producer 340 may transmit to MnS consumer 330 a getMOIAttribute(FileDownloadJob(attributes selected by the query parameters)) response. In FIG. 3B at 11, MnS consumer 330 may transmit to MnS producer 340 a modifyMOIAttributes(FileDownloadJob(administrativeState=LOCKED))) request. In FIG. 3B at 12, MnS producer 340 may transmit to MnS consumer 330 a modifyMOIAttributes(FileDownloadJob) response. Once MnS consumer 330 decides that MnS producer 340 should resume the download, in FIG. 3B at 13, MnS consumer 330 may transmit to MnS producer 340 modifyMOIAttributes(FileDownloadJob (administrativeState=UNLOCKED)) request. In FIG. 3B at 14, MnS producer 340 may transmit to MnS consumer 330 a modifyMOIAttributes(FileDownloadJob) response.

In FIG. 3C at 15, MnS producer 340 may close the file with the downloaded file content. In FIG. 3C at 16, MnS producer 340 may create a File instance. In FIG. 3C at 17, MnS producer 340 may transmit to MnS consumer 330 a notifyMOICreation(File).

In FIG. 3C at 18, MnS producer 340 may abort the file download. In FIG. 3C at 19, MnS producer 340 may update the FileDownloadJob with the final download status. In FIG. 3C at 20, MnS producer 340 may update the FileDownloadJob with the final download status.

Figure 3D:
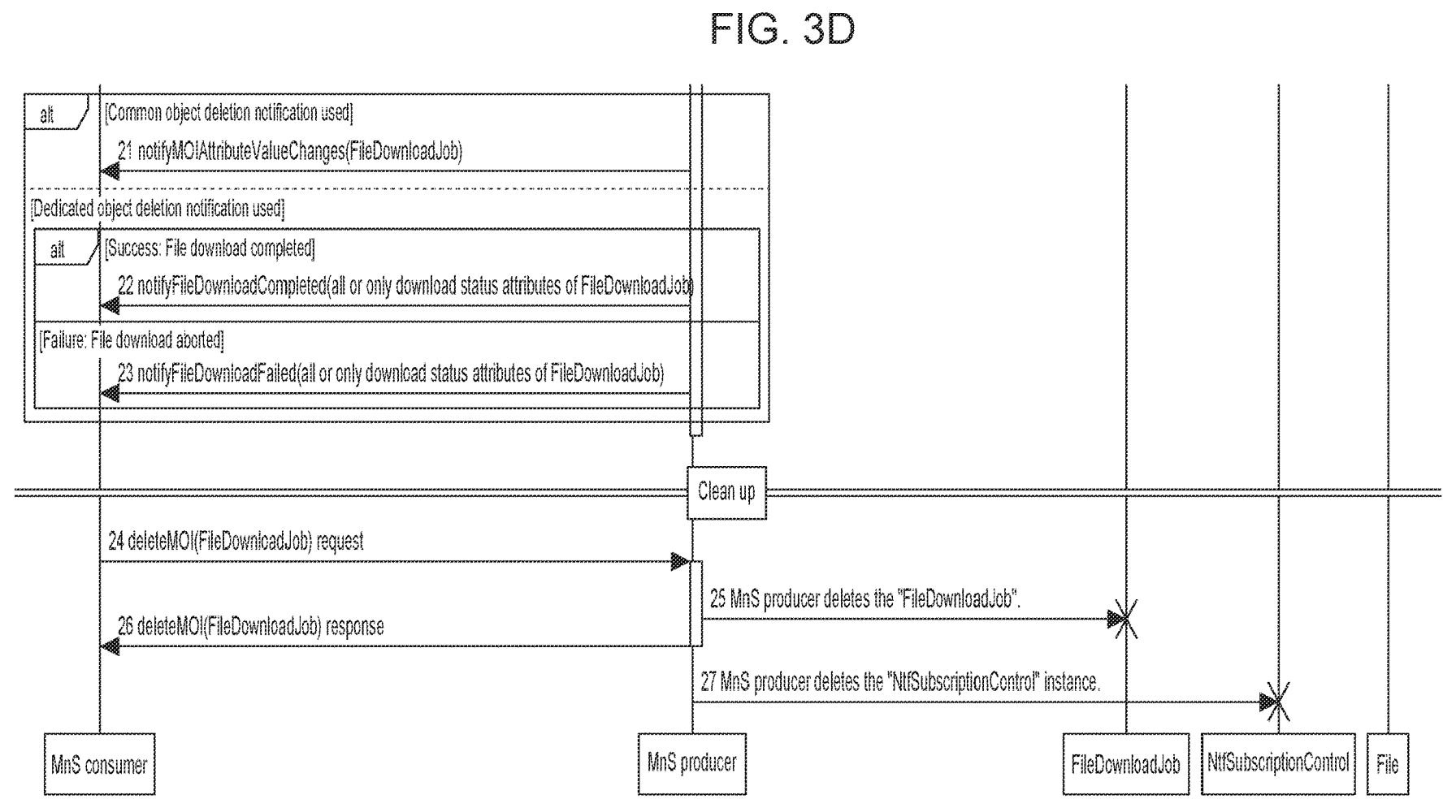

In FIG. 3D at 21, MnS producer 340 may transmit to MnS consumer 330 a notifyMOIAttributeValueChanges(FileDownloadJob). In FIG. 3D at 22, MnS producer 340 may transmit to MnS consumer 330 a notifyFileDownloadCompleted(all or only download status attributes of FileDownloadJob). In FIG. 3D at 23, MnS producer 340 may transmit to MnS consumer 330 a notifyFileDownloadFailed(all or only download status attributes of FileDownloadJob).

In FIG. 3D at 24, MnS consumer 330 may transmit to MnS producer 340 a deleteMOI(FileDownloadJob) request, and in FIG. 3D at 25, MnS producer 340 may delete the FileDownloadJob. In FIG. 3D at 26, MnS producer 340 may transmit to MnS consumer 330 a deleteMOI(FileDownloadJob) response. In FIG. 3D at 27, MnS producer 340 may delete the NtfSubscriptionControl instance.

Figure 4A:
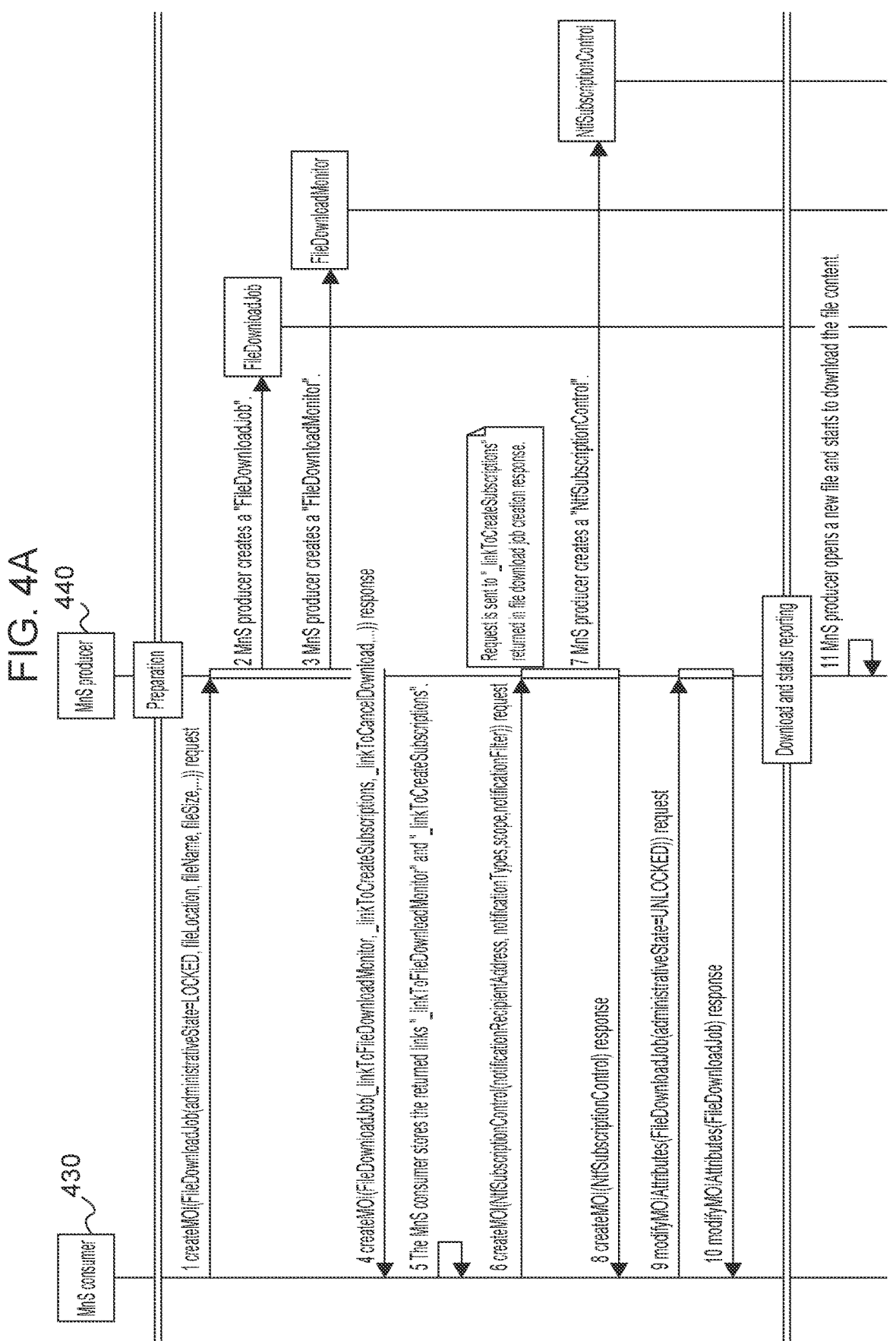
Figure 4B:
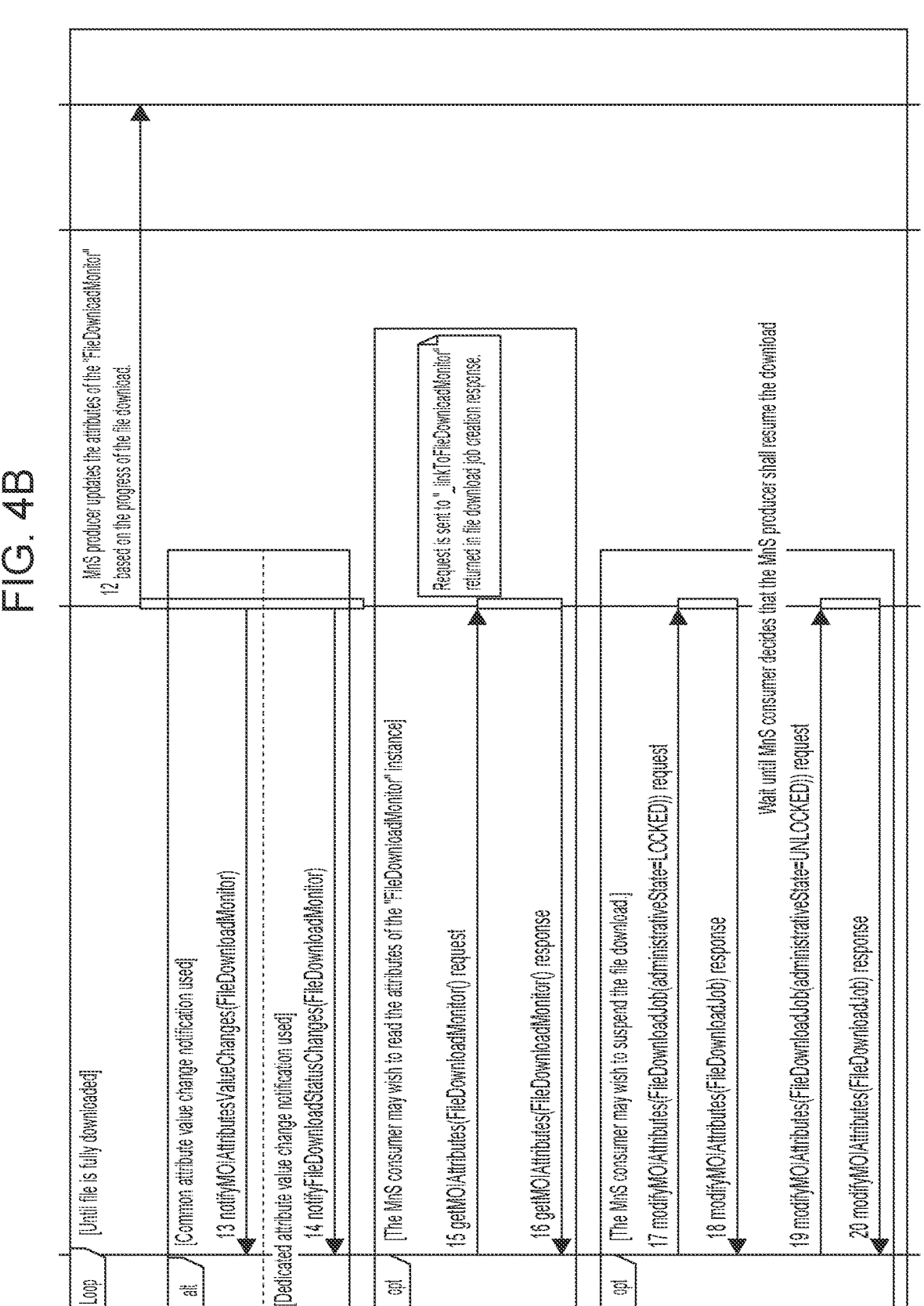
Figure 4C:
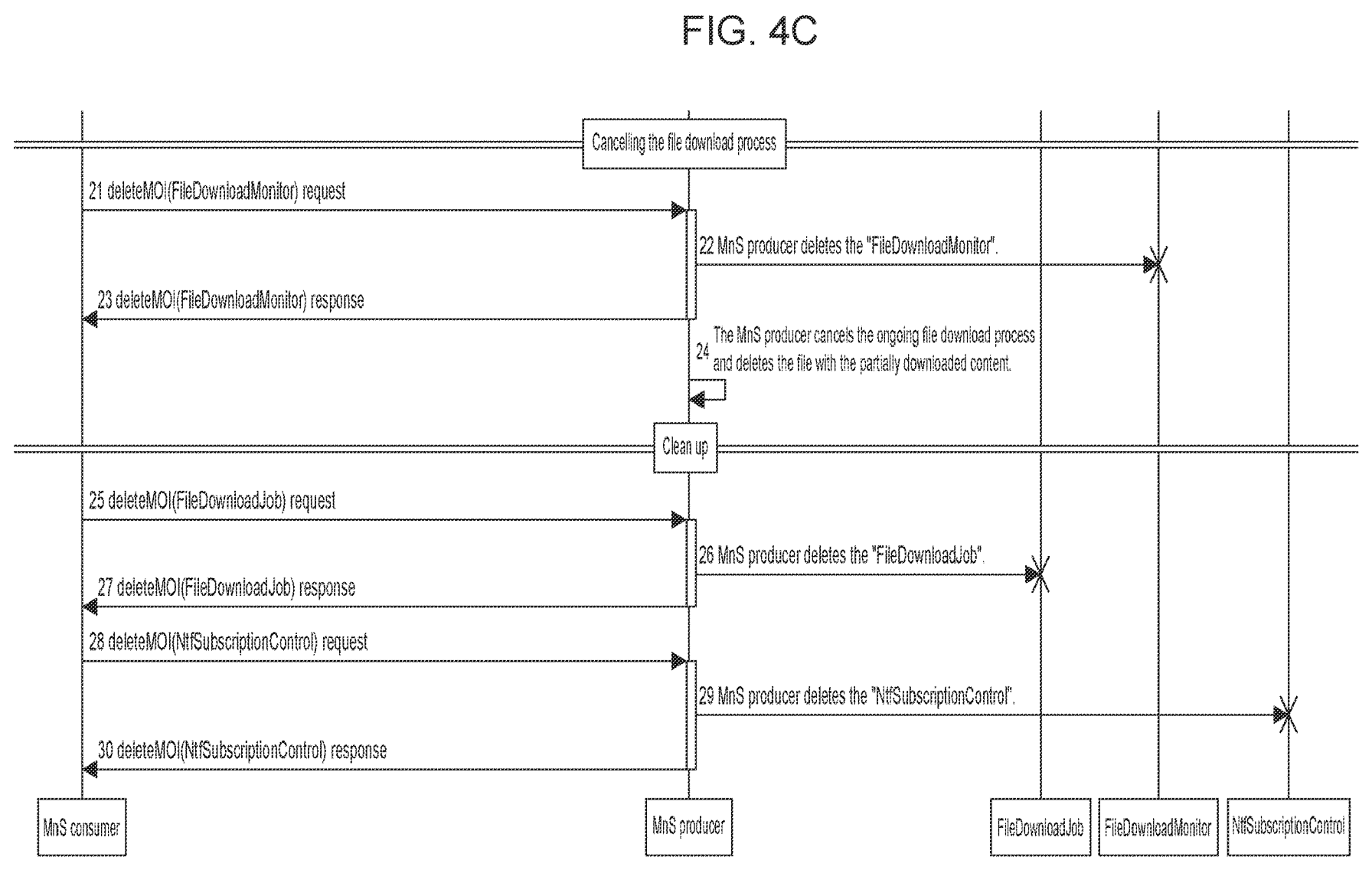

FIGS. 4A-4C illustrate an example of a signaling diagram depicting for downloading files from a MnS consumer to a MnS producer, which may be similar to the procedure described in FIGS. 1A-1D, 2A-2D, and 3A3D. MnS 430 and MnS producer 440 may be similar to UE 910 and NE 920, as illustrated in FIG. 9, according to certain example embodiments.

Figure 8:
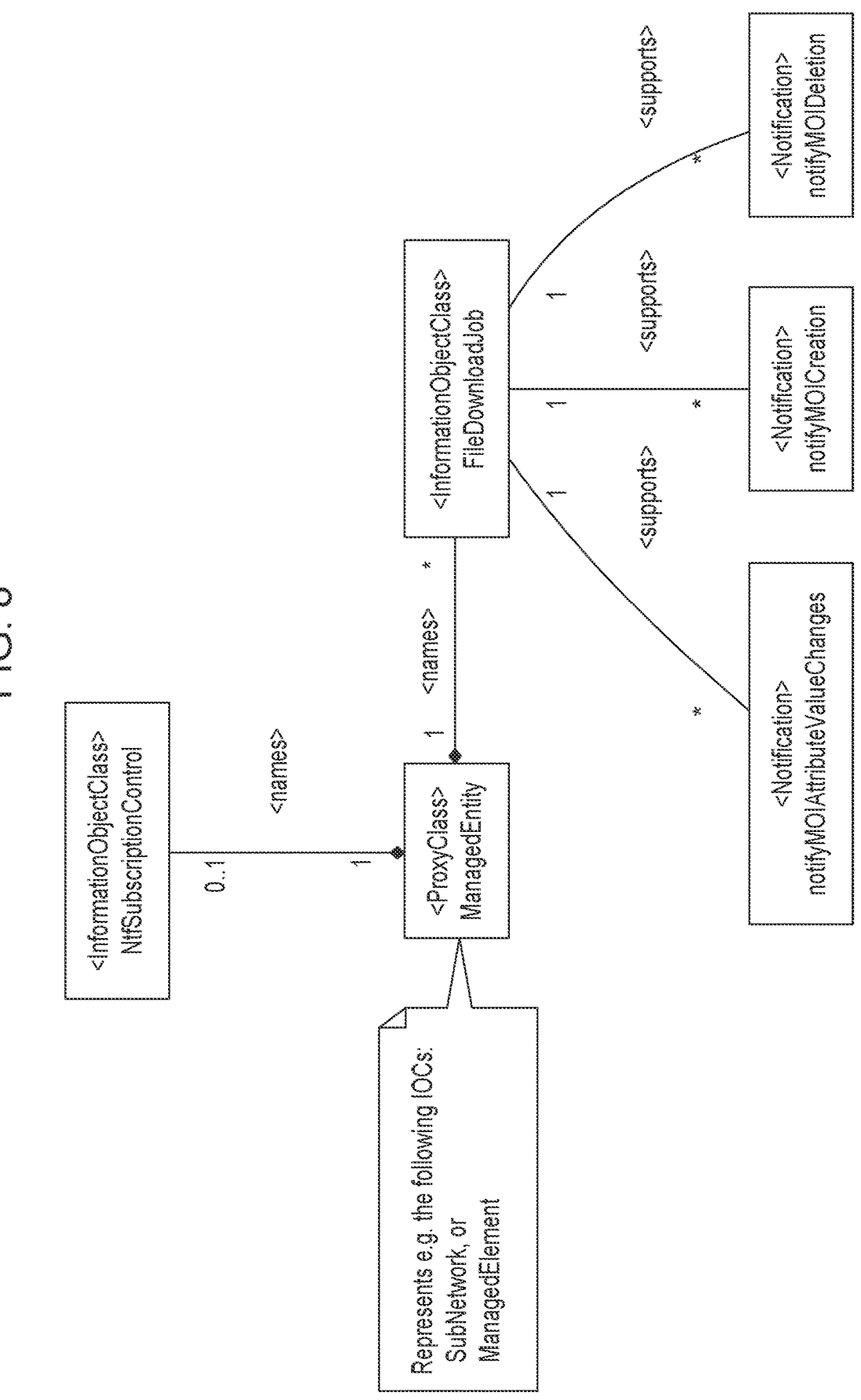
FIG. 8 illustrates another example of an NtfSubscriptionControl object.

In FIG. 4A at 1, MnS consumer 430 may transmit to MnS producer 440 a createMOI(FileDownloadJob (administrativeState=LOCKED, fileLocation, filename, fileSize, . . . )) request. In FIG. 4A at 2, MnS producer 440 may create a FileDownloadJob. In FIG. 4A at 3, MnS producer 440 may create a FileDownloadMonitor. In FIG. 4A at 4, MnS producer 440 may transmit to MnS consumer 430 a createMOI(FileDownloadJob(_linkToFileDownloadMonitor, _linkToCreateSubscriptions, linkToCancelDownload, . . . )) response. In FIG. 4A at 5, MnS consumer 430 may store the returned link _linkToFileDownloadMonitor and _linkToCreateSubscriptions. In FIG. 4A at 6, MnS consumer 430 may transmit to MnS producer 440 a createeMOI(NtfSubscriptionControl(notificationRecipientAddress, notificationTypes, scope, notificationFilter)) request. In FIG. 4A at 7, MnS producer 440 may create a NtfSubscriptionControl, such as illustrated in FIG. 8. In FIG. 4A at 8, MnS producer 440 may transmit to MnS consumer 430 a createMOI(NtfSubscriptionControl) response. In FIG. 4A at 9, MnS consumer 430 may transmit to MnS consumer 440 a modifyMOIAttributes(FileDownloadJob (administrativeState=UNLOCKED)) request. In FIG. 4A at 10, MnS producer 440 may transmit to MnS consumer 430 a modifyMOIAttributes(FileDownloadJob) response.

In FIG. 4A at 11, MnS producer 440 may open a new file and start to download the file content. In FIG. 4B at 12, MnS producer 440 may update the attributes of the FileDownloadMonitor based on the progress of the file download. In FIG. 4B at 13, MnS producer 440 may transmit to MnS consumer 430 a notifyMOIAttributeValueChanges(FileDownloadMonitor). In FIG. 4B at 14, MnS producer 440 may transmit to MnS consumer 430 a notifyFileDownloadStatusChanges(FileDownloadMonitor). In FIG. 4B at 15, MnS consumer 430 may transmit to MnS producer 440 a getMOIAttributes(FileDownloadMonitor( ) request. In FIG. 4B at 16, MnS producer 440 may transmit to MnS consumer 430 a getMOIAttributes(FileDownloadMonitor) response. In FIG. 4B at 17, MnS consumer 430 may transmit to MnS producer 440 a modifyMOIAttributes(FileDownloadJob (administrativeState=LOCKED)) request. In FIG. 4B at 18, MnS producer 440 may transmit to MnS consumer 430 a modifyMOIAttributes(FileDownloadJob) response. Upon MnS consumer 430 deciding that MnS producer 440 should resume the download, in FIG. 4B at 19, MnS consumer 430 may transmit to MnS producer 440 a modifyMOIAttributes (FileDownloadJob(administrativeState=UNLOCKED)) request. In FIG. 4B at 20, MnS producer 440 may transmit to MnS consumer 430 a modifyMOIAttributes(FileDownloadJob) response.

In FIG. 4C at 21, MnS consumer 430 may transmit to MnS producer 440 a deleteMOI(FileDownloadMonitor) request, and in FIG. 4C at 22, MnS producer 440 may delete the FileDownloadMonitor. In FIG. 4C at 23, MnS producer 440 may transmit to MnS consumer 430 a deleteMOI (FileDownloadMonitor) response. In FIG. 4C at 24, MnS producer 440 may cancel the ongoing file download process and may delete the file with the partially downloaded content.

In FIG. 4C at 25, MnS consumer 430 may transmit to MnS producer 440 a deleteMOI(FileDownloadJob) request. In FIG. 4C at 26, MnS producer 440 may delete the FileDownloadJob. In FIG. 4C at 27, MnS producer 440 may transmit to deleteMOI(FileDownloadJob) response, and in FIG. 4C at 28, MnS consumer 430 may transmit to MnS producer 440 a deleteMOI(NtfSubscriptionControl) request. In FIG. 4C at 29, MnS producer 440 may delete the NtfSubscriptionControl, and in FIG. 4C at 30 may transmit to MnS consumer 430 a deleteMOI(NtfSubscriptionControl) response.

FIG. 9 illustrates an example of a system according to certain example embodiments. In one example embodiment, a system may include multiple devices, such as, for example, UE 910 and/or NE 920.

UE 910 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

NE 920 may be one or more of a base station, such as an eNB or gNB, a serving gateway, a server, and/or any other access node or combination thereof. Furthermore, NE 810 and/or UE 820 may be one or more of a citizens broadband radio service device (CBSD).

NE 920 may further comprise at least one gNB-CU, which may be associated with at least one gNB-DU. The at least one gNB-CU and the at least one gNB-DU may be in communication via at least one F1 interface, at least one $X_n$-C interface, and/or at least one NG interface via a 5GC.

UE 910 and/or NE 920 may include at least one processor, respectively indicated as 911 and 921. Processors 911 and 921 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, as indicated at 912 and 922. The memory may be fixed or removable. The memory may include computer program instructions or computer code contained therein. Memories 912 and 922 may independently be any suitable storage device, such as a non-transitory computer-readable medium. The term "non-transitory," as used herein, may correspond to a limitation of the medium itself (i.e., tangible, not a signal) as opposed to a limitation on data storage persistency (e.g., random access memory (RAM) vs. read-only memory (ROM)). A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processors 911 and 921, memories 912 and 922, and any subset thereof, may be configured to provide means corresponding to the various blocks of FIGS. 1-8. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

As shown in FIG. 9, transceivers 913 and 923 may be provided, and one or more devices may also include at least one antenna, respectively illustrated as 914 and 924. The device may have many antennas, such as an array of antennas configured for multiple input multiple output (MIMO) communications, or multiple antennas for multiple RATs. Other configurations of these devices, for example, may be provided. Transceivers 913 and 923 may be a transmitter, a receiver, both a transmitter and a receiver, or a unit or device that may be configured both for transmission and reception.

The memory and the computer program instructions may be configured, with the processor for the particular device, to cause a hardware apparatus, such as UE, to perform any of the processes described above (i.e., FIGS. 1-8). Therefore, in certain example embodiments, a non-transitory computer-readable medium may be encoded with computer instructions that, when executed in hardware, perform a process such as one of the processes described herein. Alternatively, certain example embodiments may be performed entirely in hardware.

In certain example embodiments, an apparatus may include circuitry configured to perform any of the processes or functions illustrated in FIGS. 1-8. For example, circuitry may be hardware-only circuit implementations, such as analog and/or digital circuitry. In another example, circuitry may be a combination of hardware circuits and software, such as a combination of analog and/or digital hardware circuitry with software or firmware, and/or any portions of hardware processors with software (including digital signal processors), software, and at least one memory that work together to cause an apparatus to perform various processes or functions. In yet another example, circuitry may be hardware circuitry and or processors, such as a microprocessor or a portion of a microprocessor, that includes software, such as firmware, for operation. Software in circuitry may not be present when it is not needed for the operation of the hardware.

Figure 10:
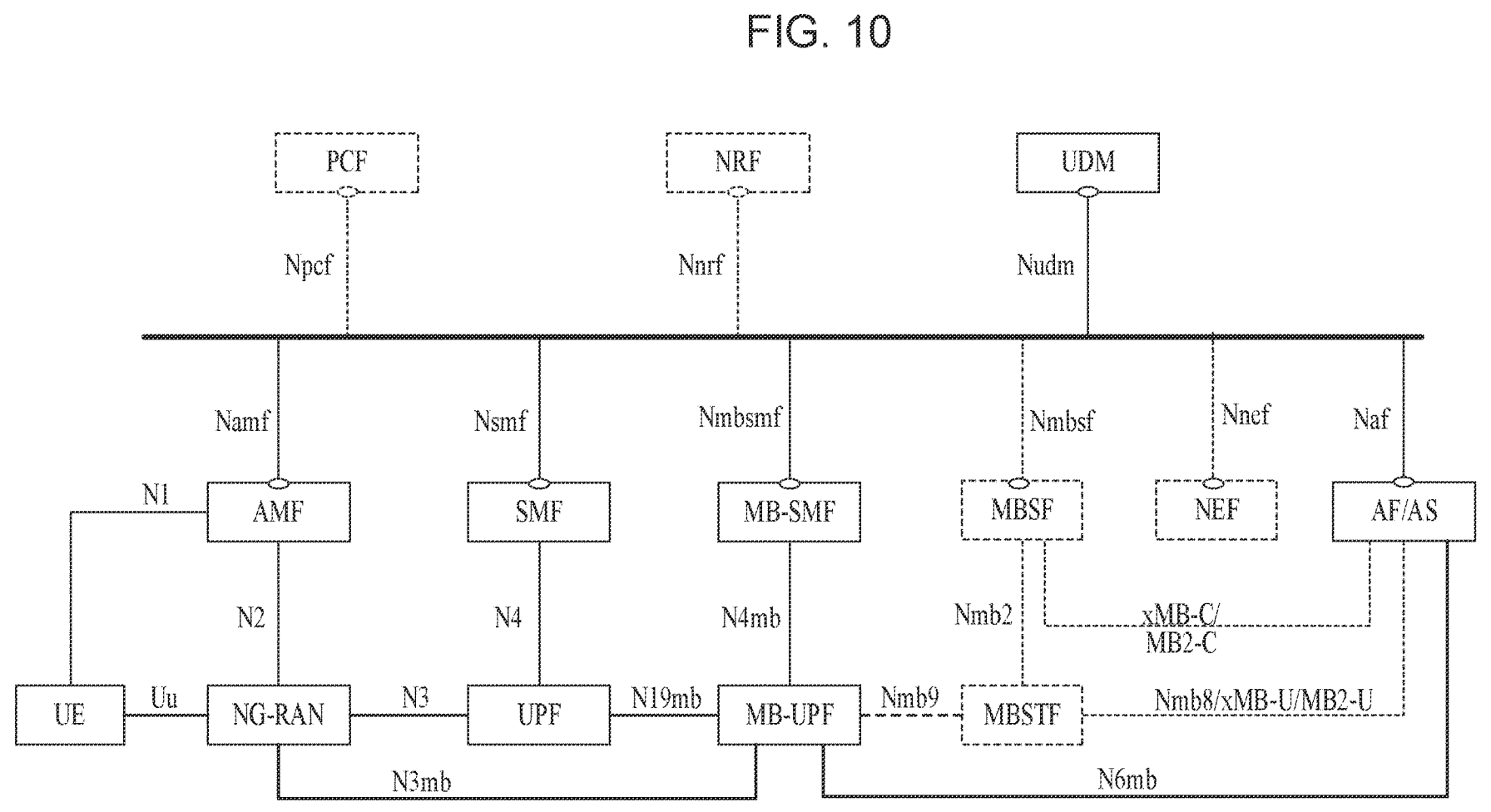

FIG. 10 illustrates an example of a 5G network and system architecture according to certain example embodiments. Shown are multiple network functions that may be implemented as software operating as part of a network device or dedicated hardware, as a network device itself or dedicated hardware, or as a virtual function operating as a network device or dedicated hardware. The UE and NE illustrated in FIG. 9 may be similar to UE 910 and NE 920, respectively. The user plane function (UPF) may provide services such as intra-RAT and inter-RAT mobility, routing and forwarding of data packets, inspection of packets, user plane quality of service (QoS) processing, buffering of downlink packets, and/or triggering of downlink data notifications. The application function (AF) may primarily interface with the core network to facilitate application usage of traffic routing and interact with the policy framework.

In various example embodiments, apparatus 920 may be controlled by memory 922 and processor 921 to transmit a request to create a file download job object associated with a file download job to a management service producer; and receive download progress status information associated with the file download job from the management service producer.

Certain example embodiments may be directed to an apparatus that includes means for performing any of the methods described herein including, for example, means for transmit a request to create a file download job object associated with a file download job to a management service producer; and means for receiving download progress status information associated with the file download job from the management service producer.

In various example embodiments, apparatus 920 may be controlled by memory 922 and processor 921 to receive a request to create a file download job object associated with a download job from a management service consumer; initiate the file download job; and transmit download progress status information associated with the file download job to the management service consumer.

Certain example embodiments may be directed to an apparatus that includes means for performing any of the methods described herein including, for example, means for receiving a request to create a file download job object associated with a download job from a management service consumer; means for initiating the file download job; and means for transmitting download progress status information associated with the file download job to the management service consumer.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

Partial Glossary

3GPP Third Generation Partnership Project
5G Fifth Generation
5GC Fifth Generation Core
5GS Fifth Generation System
5QI Fifth Generation Quality of Service Indicator
ACK Acknowledgement
AMF Access and Mobility Management Function
ARQ Automatic Repeat Request
ASIC Application Specific Integrated Circuit
BS Base Station
BSD Bucket Size Duration
BSR Buffer Status Report
CAPC Channel Access Priority Class CBSD Citizens Broadband Radio Service Device
CCCH Common Control Channel
CE Control Elements
CG Configured Grant
CM Configuration Management
CN Core Network
CPU Central Processing Unit
CRC Cyclic Redundancy Check
CRUD Create, Read, Update, Delete
DCI Downlink Control Information
DL Downlink
DMRS Demodulation Reference Signal
DRB Data Radio Bearer
eMBB Enhanced Mobile Broadband
eMTC Enhanced Machine Type Communication
eNB Evolved Node B
eOLLA Enhanced Outer Loop Link Adaptation
EPS Evolved Packet System
FDD Frequency Division Duplex
FR Frequency Range
gNB Next Generation Node B
GPS Global Positioning System
HDD Hard Disk Drive
KPI Key Performance Indicator
LTE Long-Term Evolution
LTE-A Long-Term Evolution Advanced
MAC Medium Access Control
MBS Multicast and Broadcast Systems
MC Multicast
MCS Modulation and Coding Scheme
MDT Minimisation of Drive Tests
MEMS Micro Electrical Mechanical System
MIB Master Information Block
MIMO Multiple Input Multiple Output
ML Machine Learning
MME Mobility Management Entity
MnS Management Service
mMTC Massive Machine Type Communication
MOI Managed Object Instance
MPDCCH Machine Type Communication Physical
   Downlink Control Channel
MTC Machine Type Communication
NACK Negative Acknowledgement
NAS Non-Access Stratum
NB-IoT Narrowband Internet of Things
NE Network Entity
NG Next Generation
NG-eNB Next Generation Evolved Node B
NG-RAN Next Generation Radio Access Network
NR New Radio
NRM Network Resource Model
NR-U New Radio Unlicensed
OFDM Orthogonal Frequency Division Multiplexing
OLLA Outer Loop Link Adaptation
PBR Prioritized Bit Rate
PDA Personal Digital Assistance
PDU Protocol Data Unit
RAM Random Access Memory
RAN Radio Access Network
RAT Radio Access Technology
RE Resource Element
RLC Radio Link Control
RNTI Radio Network Temporary Identifier
RRC Radio Resource Control
RS Reference Signal
RSRP Reference Signal Received Power
RU Radio Unit TR Technical Report
TS Technical Specification
TTI Transmission Time Interval
Tx Transmission
UCI Uplink Control Information
UE User Equipment
UL Uplink
UMTS Universal Mobile Telecommunications System
UPF User Plane Function
URLLC Ultra-Reliable and Low-Latency Communica-
   tion
UTRAN Universal Mobile Telecommunications System
   Terrestrial Radio Access Network
WLAN Wireless Local Area Network

We claim:

1. A method, comprising:
transmitting, by a management service consumer, a
   request to create a file download job object associated
   with a file download job to a management service
   producer, wherein the request comprises a notification
   recipient address;
determining that the notification recipient address is pres-
   ent in the request and configured to instruct the man-
   agement service producer to create automatically a
   subscription for supported monitoring notifications;
receiving, by the management service consumer, download
   progress status information associated with the file down-
   load job from the management service producer, wherein the
   download progress status information indicates an estimated
   time remaining until completion of the file download job,
   that a file to be downloaded is open and contains a percent-
   age of a target content, and a duration that the file download
   job has been running, the download progress status infor-
   mation is included in the file download job object, and the
   file download job object comprises a location of the file to
   be downloaded that is associated with a status attribute
   polling interval and a compression type attribute;
monitoring, by the management service consumer, the file
   download job according to at least one file download
   status attribute; and
determining, by the management service consumer, at
   least one of dedicated file download notifications and
   generic configuration management notifications to use
   in the notification of the automatic subscription based
   upon the management service consumer introducing a
   special selection attribute into the file download job
   object.

2. The method of claim 1, further comprising:
subscribing, by the management service consumer, to
   receive status update notifications from the manage-
   ment service producer.

3. The method of claim 1, further comprising:
cancelling, by the management service consumer, the file
   download job.

4. A method, comprising:
receiving, by a management service producer, a request to
   create a file download job object associated with a
   download job from a management service consumer,
   wherein the request comprises a notification recipient
   address configured to instruct the management service
   producer to create automatically a subscription for
   supported monitoring notifications;
initiating, by the management service producer, the file
   download job;
transmitting, by the management service producer, down-
   load progress status information associated with the file
   download job to the management service consumer, wherein the download progress status information indicates an estimated time remaining until completion of the file download job, that a file to be downloaded is open and contains a percentage of a target content, and a duration that the file download job has been running, the download progress status information is included in the file download job object, and the file download job object comprises a location of the file to be downloaded that is associated with a status attribute polling interval and a compression type attribute;

monitoring, by the management service producer, the file download job according to at least one file download status attribute; and determining, by the management service producer, at least one of dedicated file download notifications and generic configuration management notifications to use in the notification of the automatic subscription based upon a special selection attribute of the file download job object.

5. The method of claim 4, further comprising:

cancelling, by the management service producer, the file download job.

6. The method of claim 4, further comprising:

creating, by the management service producer, a file object.

\* \* \* \* \*

26